US012773707B2

(12) United States Patent
Tang

(10) Patent No.: US 12,773,707 B2
(45) Date of Patent: Oct. 27, 2026

(54) FULL-PLASTIC LIQUID PUMP AND CONTAINING CONTAINER HAVING SAME

(71) Applicant: YUYAO GREENYARD TOOLS CO., LTD., Yuyao (CN)

(72) Inventor: Kefeng Tang, Yuyao (CN)

(73) Assignee: YUYAO GREENYARD TOOLS CO., LTD., Yuyao (CN)

( * ) Notice: Subject to any disclaimer, the term of this patent is extended or adjusted under 35 U.S.C. 154(b) by 447 days.

(21) Appl. No.: 18/034,434

(22) PCT Filed: Apr. 14, 2021

(86) PCT No.: PCT/CN2021/087106

§ 371 (c)(1),
(2) Date: Oct. 13, 2023

(87) PCT Pub. No.: WO2022/052464

PCT Pub. Date: Mar. 17, 2022

(65) Prior Publication Data

US 2024/0042471 A1 Feb. 8, 2024

(30) Foreign Application Priority Data

Sep. 8, 2020 (CN) ......................... 202010935393.0
Sep. 8, 2020 (CN) ......................... 202021951520.8

(51) Int. Cl.
*B05B 11/10* (2023.01)

(52) U.S. Cl.
CPC ........ *B05B 11/106* (2023.01); *B05B 11/1077* (2023.01)

(58) Field of Classification Search
CPC ............. B05B 11/1023; B05B 11/1074; B05B 11/1077; B05B 11/1001; B05B 11/106
USPC .......................................................... 222/251
See application file for complete search history.

(56) References Cited

U.S. PATENT DOCUMENTS 5,794,821 A 8/1998 Foster et al.
2009/0102106 A1 4/2009 Ohashi et al.
2011/0303702 A1* 12/2011 Wang .................. B05B 11/1074 222/336
2015/0090741 A1* 4/2015 Laffey ................... F16F 3/0876 222/321.9

(Continued)

FOREIGN PATENT DOCUMENTS

CN 200995183 Y 12/2007
CN 201880641 U 6/2011
CN 102464133 A 5/2012

(Continued)

OTHER PUBLICATIONS

CN-110116865-A, Translation (Year: 2019).*

*Primary Examiner* — David P Angwin
(74) *Attorney, Agent, or Firm* — Che-Yang Chen

(57) ABSTRACT

Disclosed is a full-plastic liquid pump and a containing container having same, which employs a plastic spring (12) and a plastic one-way valve (15), wherein the plastic spring (12), the plastic one-way valve (15), and other parts of the full-plastic liquid pump are all made of plastic materials. The full-plastic liquid pump can be recycled as a whole without splitting, which reduces the cost of recycling the full-plastic liquid pump, and facilitates improving the utilization rate of resources, thereby better facilitating protecting environment.

5 Claims, 28 Drawing Sheets

(56) References Cited

U.S. PATENT DOCUMENTS

| | | | | |
|---|---|---|---|---|
| 2021/0178414 | A1* | 6/2021 | Lee | B05B 11/0064 |
| 2022/0106996 | A1* | 4/2022 | Goettke | F16F 1/028 |

FOREIGN PATENT DOCUMENTS

| | | | | | |
|---|---|---|---|---|---|
| CN | 107264970 | A | | 10/2017 | |
| CN | 109027080 | A | | 12/2018 | |
| CN | 109896145 | A | | 6/2019 | |
| CN | 110116865 | A | * | 8/2019 | B05B 11/1077 |
| CN | 111038842 | A | | 4/2020 | |
| CN | 111186631 | A | | 5/2020 | |
| CN | 111232419 | A | | 6/2020 | |
| CN | 111264997 | A | | 6/2020 | |
| CN | 213263643 | U | | 5/2021 | |
| DE | 102019132345 | A1 | | 7/2020 | |
| EP | 0613728 | A2 | | 9/1994 | |
| EP | 0691161 | A1 | | 1/1996 | |
| JP | H1047400 | A | | 2/1998 | |
| JP | H1072052 | A | | 3/1998 | |
| JP | H1073138 | A | | 3/1998 | |
| KR | 20040062305 | A | | 7/2004 | |
| WO | 2020156935 | A1 | | 8/2020 | |
| WO | WO-2020156933 | A1 | * | 8/2020 | F16F 1/377 |
| WO | WO-2021194551 | A1 | * | 9/2021 | F04B 53/14 |
| WO | WO-2022052462 | A1 | * | 3/2022 | B05B 11/1074 |

* cited by examiner

FULL-PLASTIC LIQUID PUMP AND CONTAINING CONTAINER HAVING SAME

CROSS REFERENCE OF RELATED APPLICATION

This is a U.S. National Stage under 35 U.S.C. 371 of the International Application Number PCT/CN2021/087106, filed Apr. 14, 2021, which claims priority under 35 U.S.C. 119 (a-d) to China patent application number 202010935393.0, filed Sep. 8, 2020; and China patent application number 202021951520.8, filed Sep. 8, 2020, the entire contents of each of which are expressly incorporated herein by reference.

BACKGROUND OF THE PRESENT INVENTION

Field of Invention

The present invention relates to a liquid pump, and more particularly to a full-plastic liquid pump and a containing container with the full-plastic liquid pump.

Description of Related Arts

The emulsion pump is installed at a containing container, and is a common press-type liquid taking device in daily life. The emulsion pump is widely applied to containers for containing daily chemical products, for example, the containers for containing products such as hand sanitizer, disinfectant, shampoo, shower gel, liquid foundation and the like, and is also suitable for the fields of medicines, foods, health care products and the like, and the emulsion pump is convenient to operate and is favored by various manufacturers and consumers.

Referring to FIG. 1A and FIG. 1B, an emulsion pump 100P of the prior art comprises a pump body 110P, a pipette 120P, a liquid outlet pipe 130P and a pressing head 140P, wherein the pump body 110P comprises a pump housing 111P, a liquid inlet ball valve 112P, a spring 113P, a piston 114P, a hollow plunger 115P and an assembling part. The pump housing 111P has an accommodating space, and the liquid inlet ball valve 112P, the spring 113P and the hollow plunger 115P are disposed in the accommodating space of the pump housing 111P. The spring 113P is installed at the hollow plunger 115P, and the piston 114P is sleeved on the hollow plunger 115P, and the liquid outlet pipe 130P is installed at the pump housing 111P in manner of being communicated with the hollow plunger 115P. The liquid inlet ball valve 112P is movably held between the pipette 120P and the pump housing 111P. The pressing head 140P is mounted with the liquid outlet pipe 130P, and the pump housing 111P is installed at a liquid bottle 200P through the assembling part 16. When the pressing head 140P of the emulsion pump 100P is pressed, the piston 114P moves downwardly, the spring 113P is compressed, the pressure in the accommodating space of the pump housing 111P increases, the liquid inlet ball valve 112P closes the opening of the pipette 120P, and the liquid outlet hole of the hollow plunger 115P is opened, so that the liquid in the accommodating space of the pump housing 111P can enter the liquid outlet pipe 130P from the hollow plunger 115P under the pressure difference, and flow out through the pressing head 140P. When the external force received by the pressing head 140P is removed, the spring 113P returns to the initial position, the piston 114P moves upward, the liquid outlet hole of the hollow plunger 115P is closed, the pressure in the accommodating space of the pump housing 111P goes down, the liquid inlet ball valve 112P opens the opening of the pipette 120P, and under the pressure difference, the liquid in the liquid bottle 200P enters inside the accommodating space of the pump housing 111P from the pipette. By repeatedly pressing the pressing head 140P, the liquid in the liquid bottle 200P can be continuously taken out.

The spring of the existing emulsion pump 100P is implemented to be made of metal material, which is beneficial to ensure that the spring can switch between the compressed state and the initial state frequently for a long time, and the metal spring has sufficient elastic force to quickly drive the liquid outlet pipe, the piston and the hollow plunger to move upward. In addition, the liquid inlet ball valve of the emulsion pump 100P is a glass ball, and the glass ball moves up and down under the action of the pressure difference to communicate the pipette with the pump body, or to block the communication between the pipette and the pump body. However, other components of the emulsion pump 100P except for the spring and the liquid inlet ball valve are all implemented to be made of plastic material. In other words, the existing emulsion pump 100P is made of at least three materials. In order to protect the environment and save resources, the discarded emulsion pump 100P will be recycled and reused, but the emulsion pump 100P made of at least three materials can only be recycled after being split. Concretely, after the emulsion pump 100P is split, classifying the spring made of metal, the liquid inlet ball valve made of glass and other components made of plastic and then recycling them, which increases the recovery cost of the emulsion pump 100P, and is not conducive to implementing the concept of environmental protection. In addition, even after classification, three different materials need to be treated with at least three processes to completely reuse the emulsion pump 100P that was split, which increases the process difficulty of recycling and reusing the emulsion pump 100P and further increases the labor and material costs of recycling the emulsion pump 100P. Further, during the using process of the existing emulsion pump 100P, the metal spring is always immersed in the liquid in the accommodating space of the pump housing 111P, so that the spring is easy to react with the liquid and contaminate the liquid in the accommodating space after a long time of immersion.

SUMMARY OF THE PRESENT INVENTION

An object of the present invention is to provide a full-plastic liquid pump and a containing container with the full-plastic liquid pump, wherein the full-plastic liquid pump is completely made of plastic material, and the full-plastic liquid pump can be recycled as a whole without splitting, which reduces the cost of recycling the full-plastic liquid pump, and facilitates improving the utilization rate of resources, thereby better facilitating protecting environment.

Another object of the present invention is to provide a full-plastic liquid pump and a containing container with the full-plastic liquid pump, wherein the full-plastic liquid pump is made of only one material, which reduces the requirements of the treatment process of the recycling and reusing.

Another object of the present invention is to provide a full-plastic liquid pump and a containing container with the full-plastic liquid pump, wherein the full-plastic liquid pump employs a plastic spring and a plastic one-way valve, wherein the plastic spring, the plastic one-way valve and other components of the full-plastic liquid pump are made of plastic material, which is convenient for subsequent recycling and reusing as a whole.

Another object of the present invention is to provide a full-plastic liquid pump and a containing container with the full-plastic liquid pump, wherein the plastic spring of the full-plastic liquid pump comprises an upper maintaining portion, a lower maintaining portion and at least one elastic portion, wherein the elastic portion is deformably and curvedly extended from the upper maintaining portion to the lower maintaining portion, wherein during the process that the upper maintaining portion and the lower maintaining portion are driven to approach each other, the elastic portion is squeezed to generate an elastic deformation and accumulate an elastic potential energy, and when the external force received by the upper maintaining portion and the lower maintaining portion is removed, the elastic portion releases the elastic potential energy and drives the upper maintaining portion and the lower maintaining portion to return to their initial positions. The plastic spring can be integrally molded in manner of injection molding, with low manufacturing cost and fast production cycle, which facilitates reducing the production cost of the full-plastic liquid pump.

Another object of the present invention is to provide a full-plastic liquid pump and a containing container with the full-plastic liquid pump, wherein the plastic one-way valve comprises a fixing portion, a connecting portion and a shielding portion, wherein the fixing portion is fixed at a pump housing of the full-plastic liquid pump, the connecting portion is deformably connected with the fixing portion and the shielding portion, and the shielding portion is capable of being driven to move up and down relative to the fixing portion, so as to allow liquid to flow through or block liquid flowing through.

According to one aspect of the present invention, the present invention provides a full-plastic liquid pump, comprising:

- a movable flow guiding member having a flow guiding passage;
- a liquid taking pressing cap having a liquid outlet channel, wherein the liquid taking pressing cap is disposed at the movable flow guiding member in the manner that the liquid outlet channel is communicated with the flow guiding passage of the movable flow guiding member; and
- a pump main body comprising a pump housing, a plastic spring, a piston, a piston base, a plastic one-way valve and an assembling housing, wherein the pump housing has a liquid storage cavity, wherein the piston base has a communicating channel and a flow communicating hole communicated with the communicating channel, wherein the plastic spring comprises an upper maintaining portion, a lower maintaining portion and at least one elastic portion, wherein the elastic portion is deformably and curvedly extended from the upper maintaining portion to the lower maintaining portion, and the upper maintaining portion, the lower maintaining portion and the elastic portion are integrally molded, and the piston is installed at the piston base in manner of being capable of covering the flow communicating hole of the piston base, and the piston base is installed at the movable flow guiding member in the manner that the communicating channel is communicated with the flow guiding passage of the movable flow guiding member, and the plastic one-way valve is movably disposed at the pump housing, and the pump housing is disposed at the assembling housing, and the plastic spring is capable of driving the movable flow guiding member, the piston and the piston base to move relative to the pump housing, and the flow guiding passage of the movable flow guiding member is communicated with the liquid storage cavity of the pump housing.

According to one embodiment of the present invention, the elastic portion is implemented as two, and two said elastic portions are spacedly held between the upper maintaining portion and the lower maintaining portion.

According to one embodiment of the present invention, the elastic portion is implemented as three or more, and these said elastic portions are held between the upper maintaining portion and the lower maintaining portion and are separated from each other.

According to one embodiment of the present invention, the plastic spring has an installing channel defined among the upper maintaining portion, the elastic portion and the lower maintaining portion, and an opening of the installing channel is defined at the upper maintaining portion, and another opening is defined at the lower maintaining portion.

According to one embodiment of the present invention, the connection position between the elastic portion and the upper maintaining portion is located at the symmetrical axis of the upper maintaining portion, and the connection position between the elastic portion and the lower maintaining portion is located at the symmetrical axis of the lower maintaining portion.

According to one embodiment of the present invention, the upper maintaining portion and the lower maintaining portion are held to be parallel with each other.

According to one embodiment of the present invention, the elastic portion is wavily extended from the upper maintaining portion to the lower maintaining portion.

According to one embodiment of the present invention, two said elastic portion are helically extended from the upper maintaining portion to the lower maintaining portion respectively.

According to one embodiment of the present invention, the elastic portion comprises at least one first elastic unit and at least one second elastic unit, wherein every two neighboring said first elastic unit and said second elastic unit are connected with each other end to end, and every two neighboring the first elastic unit and the second elastic unit are extended along two different directions, and the number of the first elastic unit is the same as the second elastic unit, and the end portion of the first elastic unit located at one end of the elastic portion is connected to the upper maintaining portion, and the end portion of the second elastic unit located at another end of the elastic portion is connected to the lower maintaining portion.

According to one embodiment of the present invention, the elastic portion comprises at least one first elastic unit and at least one second elastic unit, wherein every two neighboring said first elastic unit and said second elastic unit are connected with each other end to end, and the first elastic unit and the second elastic unit are respectively extended along two different directions, and the first elastic unit and the second elastic unit are different in number, and the end portions of two said first elastic units which are located at opposite ends of the elastic portion are connected to the upper maintaining portion and the lower maintaining portion respectively.

According to one embodiment of the present invention, the plastic spring further comprises at least one restricting portion, and the restricting portion is connected to two adjacent elastic portions.

According to one embodiment of the present invention, the plastic spring further comprises at least one restricting portion, wherein the restricting portion is connected to two adjacent elastic portion at a connection position of the first elastic unit and the second elastic unit.

According to one embodiment of the present invention, the elastic portion of the plastic spring is implemented as one, and the elastic portion is a wavy tubular structure.

According to one embodiment of the present invention, the plastic one-way valve comprises a fixing portion, at least one connecting portion and a shielding portion, wherein the fixing portion has a flow communicating channel, wherein the connecting portion is deformably extended from the fixing portion to the shielding portion, wherein the shielding portion is movably held in the flow communicating channel of the fixing portion.

According to one embodiment of the present invention, the fixing portion of the plastic one-way valve is fixed to the pump housing of the pump main body in manner of clearance fit, threaded connection or gluing.

According to one embodiment of the present invention, a lower surface of the shielding portion of the plastic one-way valve is an arc-shaped curved surface or a plane surface.

According to one embodiment of the present invention, the connecting portion of the plastic one-way valve is implemented as one, and the shielding portion is allowed to be flipped up and down relative to the fixing portion.

According to one embodiment of the present invention, the connecting portion of the plastic one-way valve is implemented as at least two, and at least two said connecting portions are connected to the shielding portion and the fixing portion and are separated from each other.

According to one embodiment of the present invention, the full-plastic liquid pump further comprises a flow guiding pipe having a flow guiding channel, wherein the flow guiding pipe is disposed at the pump housing, and the plastic one-way valve is disposed between the flow guiding pipe and the pump housing, and the opening of the flow guiding channel is opened or closed by the plastic one-way valve.

According to another aspect of the present invention, the present invention further provides a containing container with a full-plastic liquid pump which comprises:

a containing container having a liquid accommodating space; and a full-plastic liquid pump comprising a movable flow guiding member having a flow guiding passage, a liquid taking pressing cap having a liquid outlet channel, a pump main body and a flow guiding pipe having a flow guiding channel, wherein the liquid taking pressing cap is disposed at the movable flow guiding member in the manner that the liquid outlet channel is communicated with the flow guiding passage of the movable flow guiding member, wherein the pump main body comprising a pump housing, a plastic spring, a piston, a piston base, a plastic one-way valve and an assembling housing, wherein the pump housing has a liquid storage cavity, wherein the piston base has a communicating channel and a flow communicating hole communicated with the communicating channel, wherein the plastic spring comprises an upper maintaining portion, a lower maintaining portion and at least one elastic portion, wherein the elastic portion is deformably and curvedly extended from the upper maintaining portion to the lower maintaining portion, and the upper maintaining portion, the lower maintaining portion and the elastic portion are integrally molded, and the piston is installed at the piston base in manner of being capable of covering the flow communicating hole of the piston base, and the piston base is installed at the movable flow guiding member in the manner that the communicating channel is communicated with the flow guiding passage of the movable flow guiding member, and the pump housing is disposed at the assembling housing, and the plastic spring is capable of driving the movable flow guiding member, the piston and the piston base to move relative to the pump housing, and the flow guiding passage of the movable flow guiding member is communicated with the liquid storage cavity of the pump housing, and the plastic one-way valve is movably disposed between the pump housing and the flow guiding pipe, and the assembling housing is disposed at the containing container, and the flow guiding channel of the flow guiding pipe is communicated with the liquid accommodating space of the containing container.

According to one embodiment of the present invention, the elastic portion is implemented as two, and two said elastic portions are spacedly held between the upper maintaining portion and the lower maintaining portion.

According to one embodiment of the present invention, the elastic portion is implemented as three or more, and these said elastic portions are spacedly held between the upper maintaining portion and the lower maintaining portion.

According to one embodiment of the present invention, the plastic spring has an installing channel defined among the upper maintaining portion, the elastic portion and the lower maintaining portion, and one opening of the installing channel is formed at the upper maintaining portion, and another opening is formed at the lower maintaining portion.

According to one embodiment of the present invention, the connection position between the elastic portion and the upper maintaining portion is located at the symmetrical axis of the upper maintaining portion, and the connection position between the elastic portion and the lower maintaining portion is located at the symmetrical axis of the lower maintaining portion.

According to one embodiment of the present invention, the elastic portion is wavily extended from the upper maintaining portion to the lower maintaining portion.

According to one embodiment of the present invention, two said elastic portion are helically extended from the upper maintaining portion to the lower maintaining portion respectively.

According to one embodiment of the present invention, the elastic portion comprises at least one first elastic unit and at least one second elastic unit, wherein every two neighboring said first elastic unit and said second elastic unit are connected with each other end to end, and the first elastic unit and the second elastic unit are respectively extended along two different directions, and the number of the first elastic unit and the second elastic unit are the same, and the end portion of the first elastic unit which is located at one end of the elastic portion is connected to the upper maintaining portion, and the end portion of the second elastic unit which is located at another end of the elastic portion is connected to the lower maintaining portion.

According to one embodiment of the present invention, the elastic portion comprises at least one first elastic unit and at least one second elastic unit, wherein every two neighboring said first elastic unit and said second elastic unit are connected with each other end to end, and the first elastic unit and the second elastic unit are respectively extended along two different directions, and the first elastic unit and the second elastic unit are different in number, and the end portions of two said first elastic units which are located at opposite ends of the elastic portion are connected to the upper maintaining portion and the lower maintaining portion respectively.

According to one embodiment of the present invention, the plastic spring further comprises at least one restricting portion, and the restricting portion is connected to two adjacent said elastic portions.

According to one embodiment of the present invention, the restricting portion is connected to the elastic portion at the connection position of the first elastic unit and the second elastic unit.

DETAILED DESCRIPTION OF THE PREFERRED EMBODIMENT

Figure 1A:
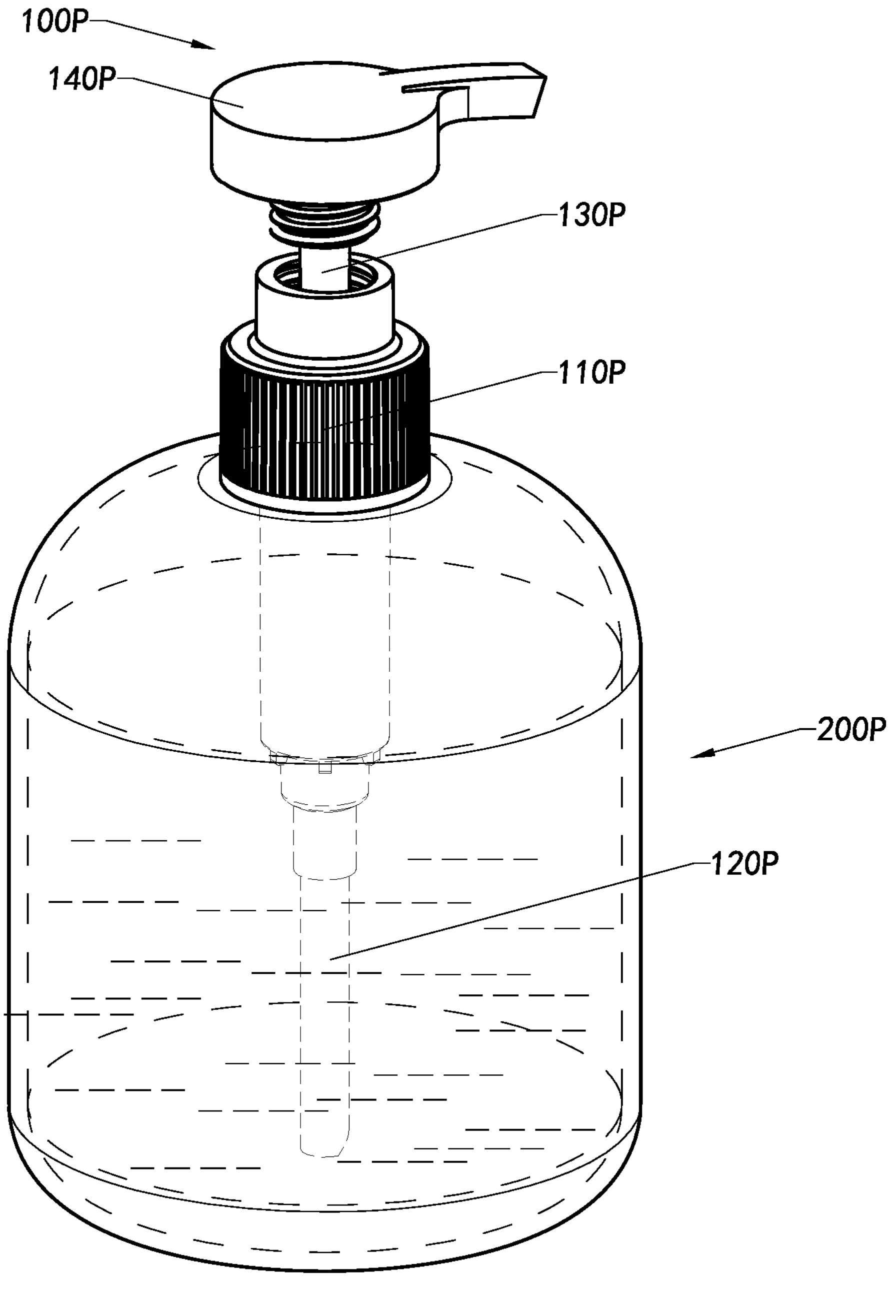
FIG. 1A is a perspective view of an existing emulsion bottle.
Figure 1B:
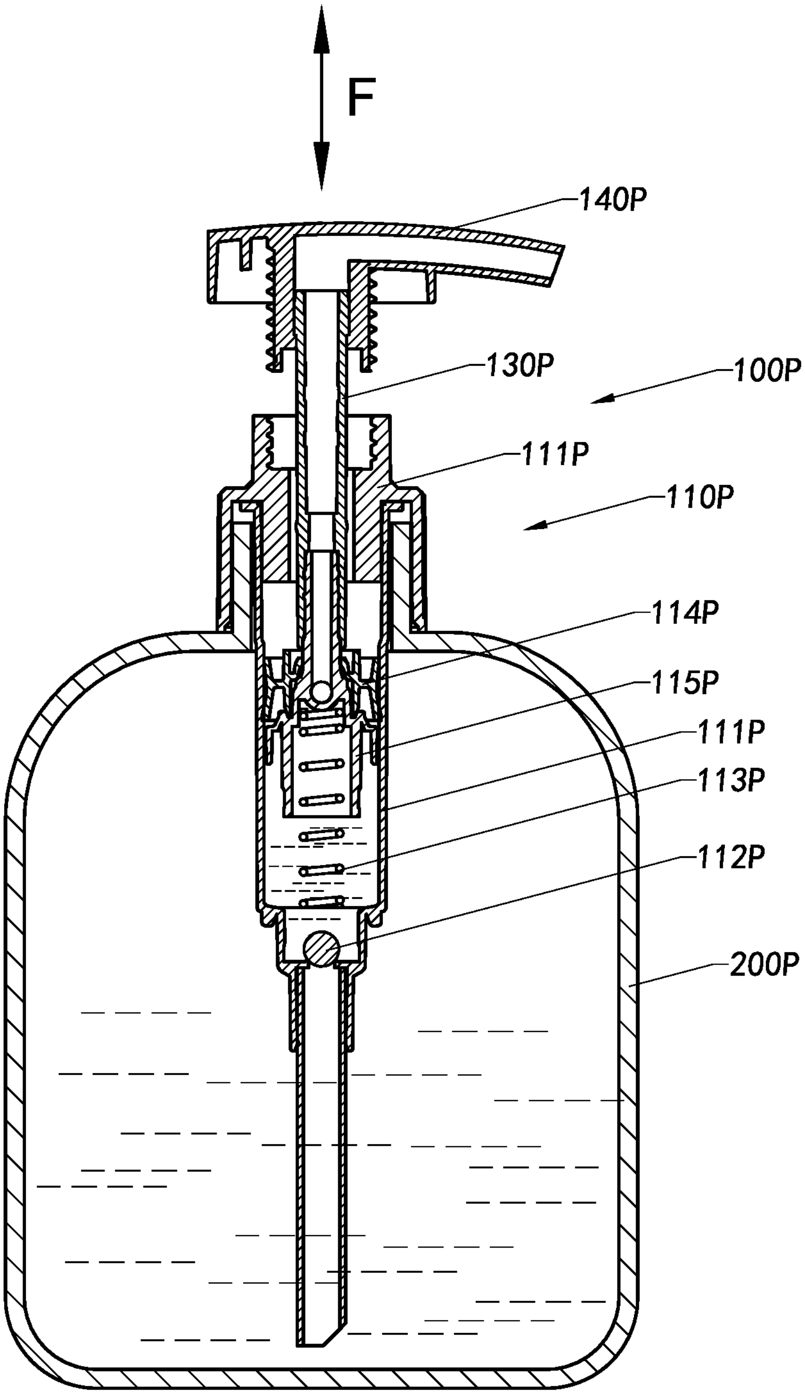
FIG. 1B is a sectional view of the existing emulsion bottle.
Figure 2:
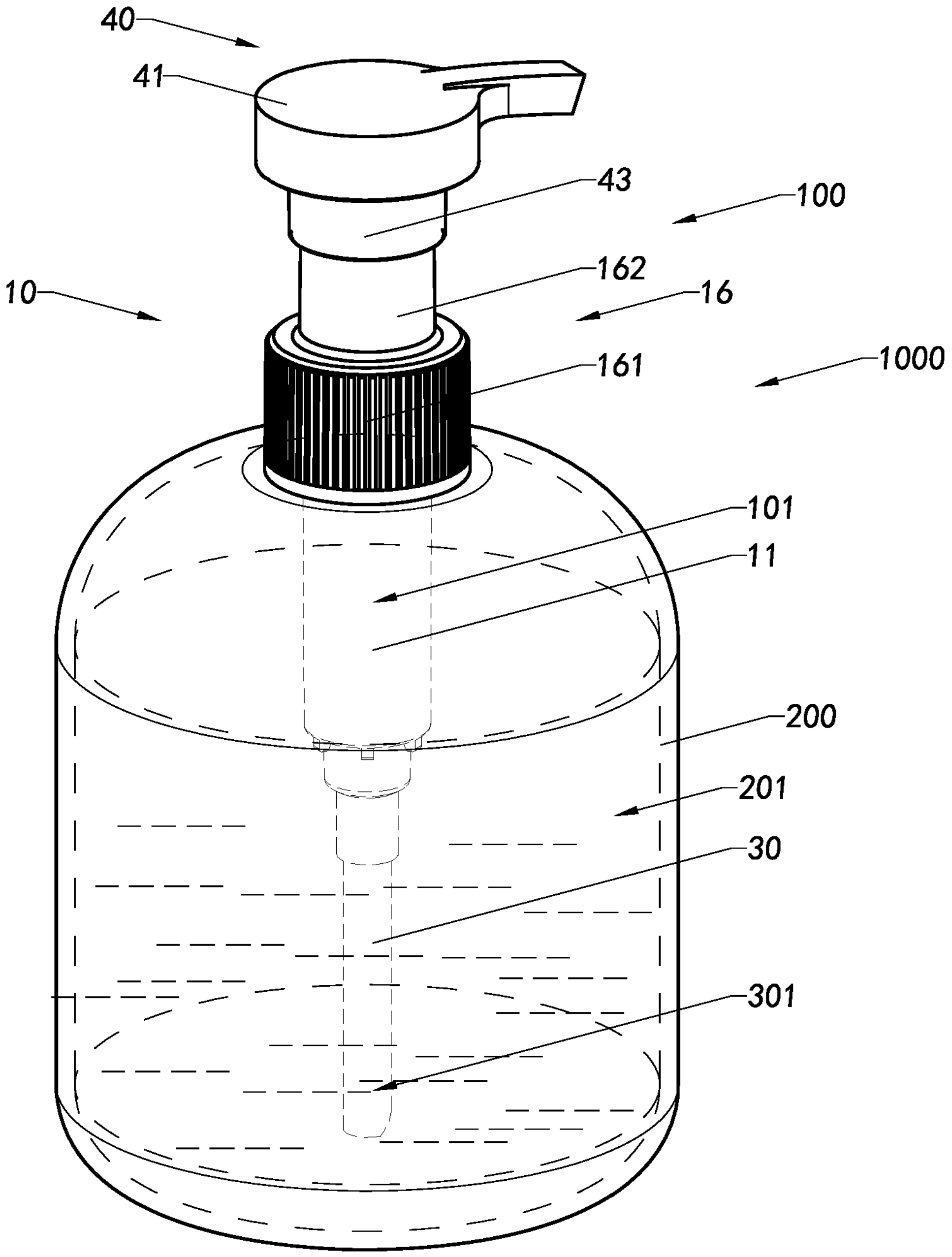
FIG. 2 is a perspective view of a containing container with a full-plastic liquid pump according to a preferred embodiment of the present invention.

The following description is used to disclose the present invention to enable those skilled in the art to realize the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that in the disclosure of the present invention, the orientations or positional relationships indicated by the terms "vertical", "horizontal", "up", "down", "front", "rear", "left", "right", "vertical", "horizontal", "top", "bottom", "inner", "outer" and the like are based on the orientations or positional relationships shown in the drawings, which are merely for the convenience of describing the present invention and simplification of the description, rather than indicating or implying that the device or element should be located in specific orientation or should be constructed and operated in a specific orientation. In this way, the above terms of description should not be construed as limitations on the invention.

It should be appreciated that the terms "one", "a", and "an" refer to "at least one" or "one or more". In particular, the term "a" in one embodiment may refer to "one" while in another embodiment may refer to "more than one". Therefore, the above terms should not be an actual numerical limitation on the elements of the present invention.

Referring to FIGS. 2 to 10B and FIG. 21, a containing container with a full-plastic liquid pump 1000 according to some preferred embodiments of the present invention will be illustrated in the following description, wherein the containing container with a full-plastic liquid pump 1000 comprises a full-plastic liquid pump 100 and a containing container 200, wherein the full-plastic liquid pump 100 is detachably installed at the containing container 200, and the liquid in a liquid receiving space 200A of the containing container 200 can be obtained in manner of pressing the full-plastic liquid pump 100. Further, the full-plastic liquid pump 100 is completely made of plastic material, and the full-plastic liquid pump 100 can be recycled as a whole without splitting, which reduces the cost of recycling the full-plastic liquid pump 100, and facilitates improving the utilization rate of resources, thereby better facilitating protecting environment.

In this specific embodiment of the present invention, the full-plastic liquid pump 100 is capable of preventing external contaminants from entering the liquid receiving space 200A of the containing container 200, so as to prevent the liquid contained in the containing container with a full-plastic liquid pump 1000 from being contaminated.

Figure 3:
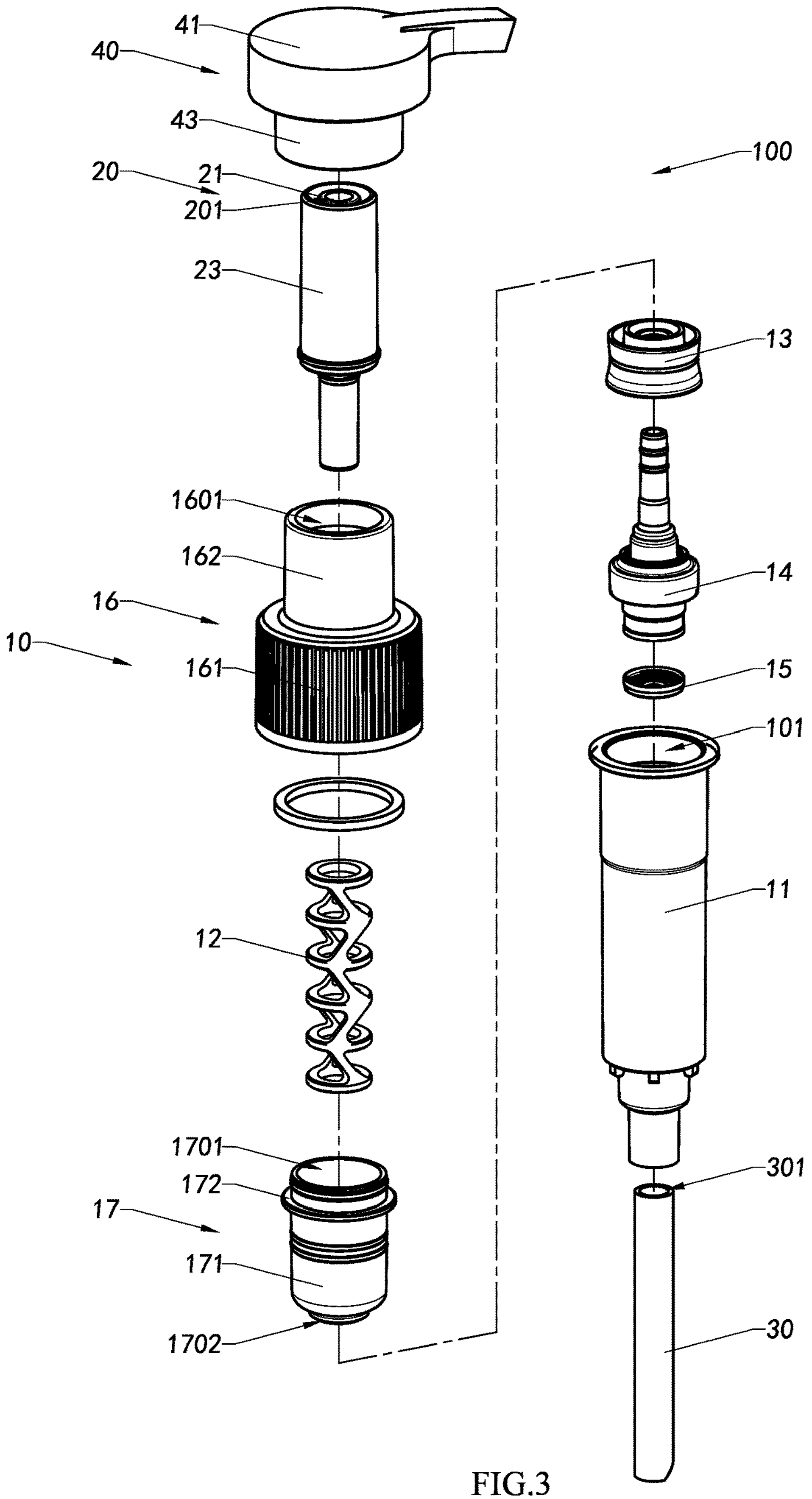
FIG. 3 is an exploded view of the full-plastic liquid pump of the containing container with a full-plastic liquid pump according to the above preferred embodiment of the present invention.
Figure 4:
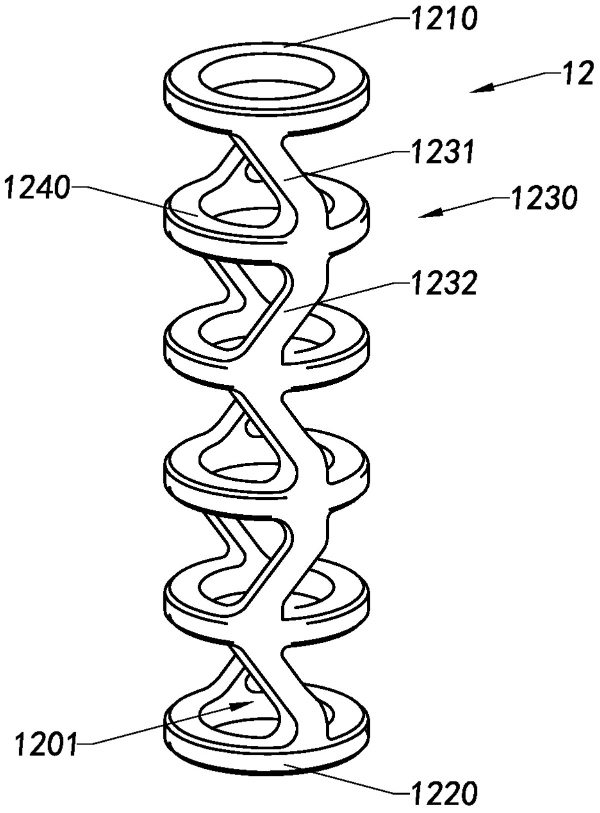
FIG. 4 is a structure diagram of a plastic spring of the full-plastic liquid pump according to the above preferred embodiment of the present invention.
Figure 5:
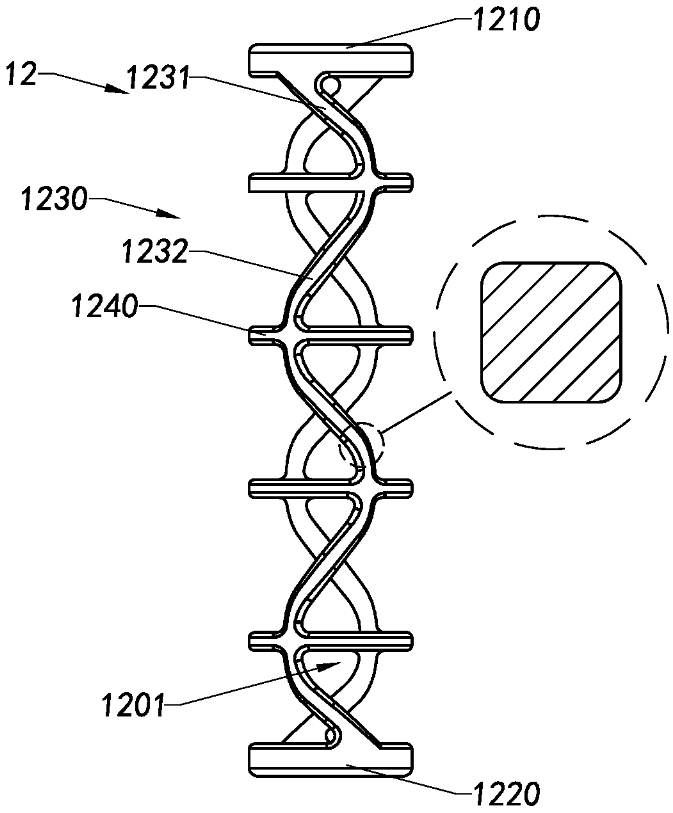
FIG. 5 is another structure diagram of the plastic spring of the full-plastic liquid pump according to the above preferred embodiment of the present invention.

Specifically, referring to FIG. 3, the full-plastic liquid pump 100 comprises a pump main body 10, a movable flow guiding member 20, a flow guiding pipe 30 and a liquid taking pressing cap 40, wherein the pump main body 10 has a liquid storage cavity 101, wherein the movable flow guiding member 20 has a flow guiding passage 201, wherein the flow guiding pipe 30 has a flow guiding channel 301, and the liquid taking pressing cap 40 has a liquid outlet channel 401. The movable flow guiding member 20 is movably installed at the pump main body 10, and the flow guiding passage 201 of the movable flow guiding member 20 is provided to be capable of being selectively communicated with the liquid storage cavity 101 of the pump main body 10. The flow guiding pipe 30 is installed at the pump main body 10, and the flow guiding channel 301 of the flow guiding pipe 30 is provided to be capable of being selectively communicated with the liquid storage cavity 101 of the pump main body 10. The pump main body 10 is detachably installed at the containing container 200, and the flow guiding channel 301 of the flow guiding pipe 30 is communicated with the liquid receiving space 200A of the containing container 200. The liquid taking pressing cap 40 is disposed at the movable flow guiding member 20 in the manner that the liquid outlet channel 401 is communicated with the movable flow guiding member 20.

Figure 9:
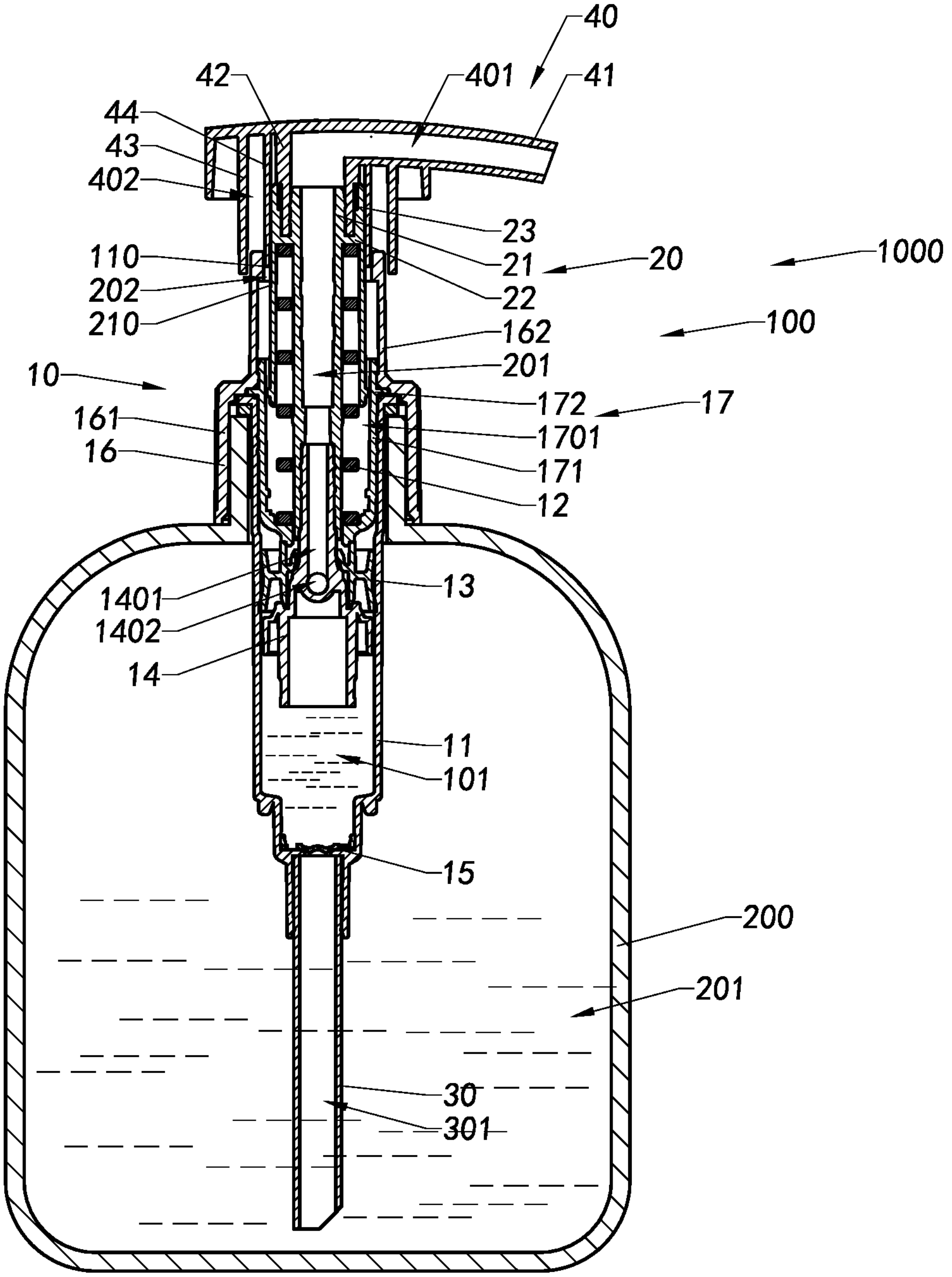
FIG. 9 is a sectional view of the containing container with a full-plastic liquid pump according to the above preferred embodiment of the present invention.
Figure 10A:
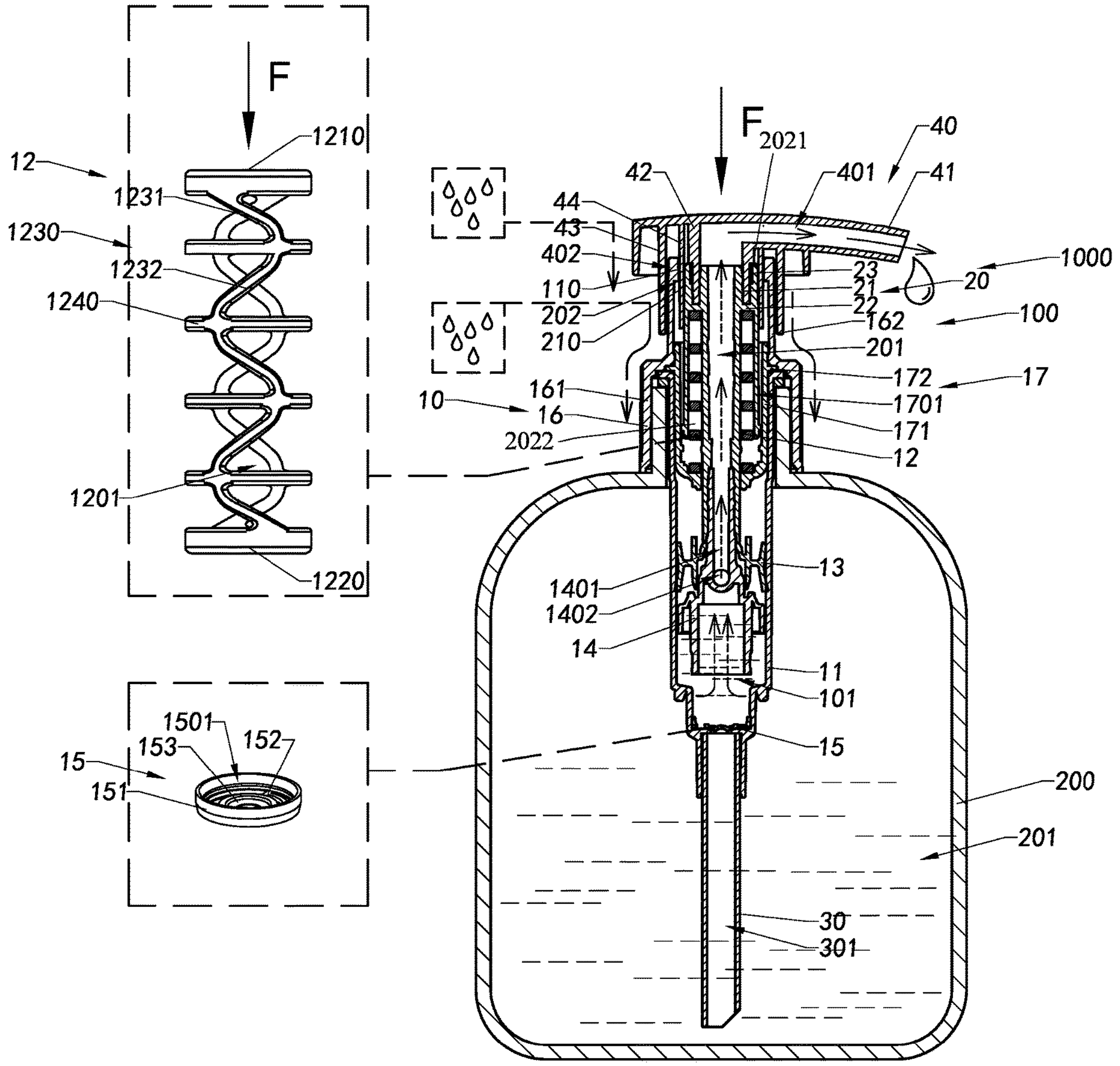
FIG. 10A is an application schematic diagram of the containing container with a full-plastic liquid pump according to the preferred embodiment of the present invention.
Figure 10B:
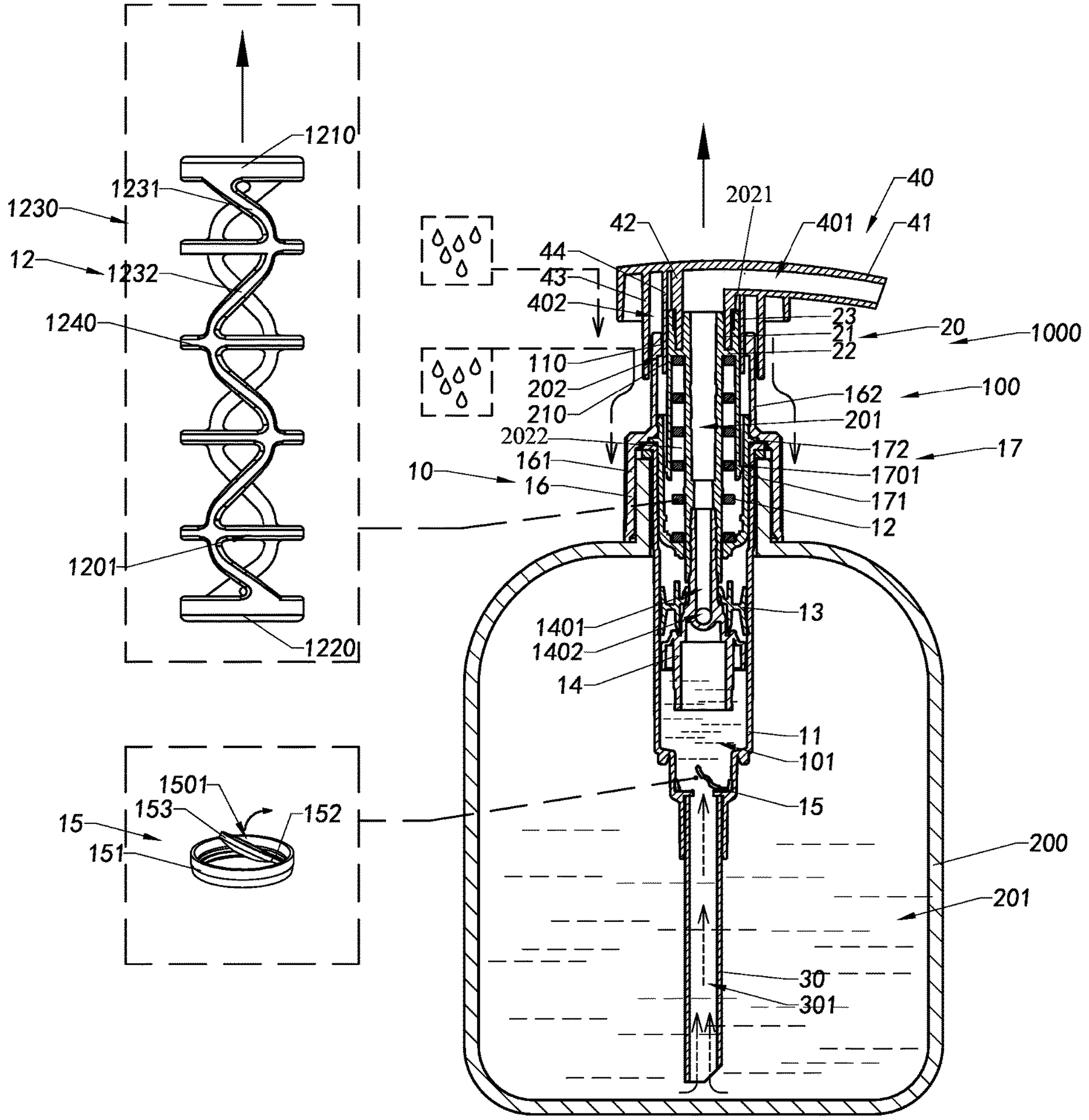
FIG. 10B is an application schematic diagram of the containing container with a full-plastic liquid pump according to the preferred embodiment of the present invention.

Further, referring to FIGS. 9 to 10B, the movable flow guiding member 20 has an outer assembling wall 210, the pump main body 10 has an inner assembling wall 110, wherein the movable flow guiding member 20 is movably installed at the pump main body 10 in the manner that the outer assembling wall 210 corresponds to the inner assembling wall 110 of the pump main body 10, and the outer assembling wall 210 of the movable flow guiding member 20 and the inner assembling wall 110 of the pump main body 10 define a moving gap 202 therebetween, so that the movable flow guiding member 20 is capable of being driven easily and moving up and down relative to the pump main body 10. During the process that the movable flow guiding member 20 moves up and down relative to the pump main body 10, the liquid in the liquid receiving space 200A of the containing container 200 is capable of flowing through the flow guiding channel 301 of the flow guiding pipe 30, the liquid storage cavity 101 of the pump main body 10 and the flow guiding passage 201 of the movable flow guiding member 20 in turn, and then flowing out of the liquid outlet channel 401 of the liquid taking pressing cap 40.

Further, the liquid taking pressing cap 40 is disposed above the pump main body 10 in manner of covering the moving gap 202, to avoid the opening of the moving gap 202 being exposed, and then prevent the external liquid from gradually entering the liquid storage cavity 101 of the pump main body 10 and the liquid receiving space 200A of the containing container 200 from the opening of the moving gap 202, thereby avoiding the liquid in the liquid storage cavity 101 and the liquid receiving space 200A being contaminated. In other words, the opening of the moving gap formed between the outer assembling wall 210 of the movable flow guiding member 20 and the inner assembling wall 110 of the pump main body 10 is hidden inside an anti-contamination space 402 of the liquid taking pressing cap 40.

The pump main body 10 comprises a pump housing 11, a plastic spring 12, a piston 13, a piston base 14, a plastic one-way valve 15 and an assembling housing 16, wherein the liquid storage cavity 101 is defined by the pump main body 11, wherein the piston base 14 has a communicating channel 1401 and a flow communicating hole 1402 communicated with the communicating channel 1401, wherein the assembling housing 16 has an assembling channel 1601.

The piston 13 is installed at the piston base 14 in manner of covering the flow communicating hole 1402 of the piston base 14, and the piston 13 is capable of moving relative to the piston base 14. The outer wall of the piston 13 is capable of being attached at the inner wall of the pump housing 11 to block the flow of liquid and air. The piston base 14 is installed at the movable flow guiding member 20 in the manner that the communicating channel 1401 is communicated with the flow guiding passage 201 of the movable flow guiding member 20. The plastic spring 12 is sleeved at the movable flow guiding member 20, and the plastic spring 12 is capable of driving the movable flow guiding member 20, the piston 13 and the piston base 14 to move. The pump housing 11 is disposed at the flow guiding pipe 30. Preferably, the flow guiding pipe 30 is detachably installed at the pump housing 11 of the pump main body 10. Alternatively, the flow guiding pipe 30 is integrally molded with the pump housing 11 of the pump main body 10. The plastic one-way valve 15 is movably disposed between the pump housing 11 and the flow guiding pipe 30, and the plastic one-way valve 15 is capable of closing or opening the opening of the flow guiding pipe 30. The pump housing 11 and the movable flow guiding member 20 are installed in the assembling channel 1601 of the assembling housing 16, and the full-plastic liquid pump 100 is detachably installed at the containing container 200 by the assembling housing 16. Preferably, the assembling housing 16 is installed at the containing container 200 in manner of threaded connection.

Referring to FIGS. 9 to 10B, in this specific embodiment of the present invention, the movable flow guiding member 20 comprises a flow guiding portion 21, an abutting portion 22 and a holding portion 23, wherein the flow guiding passage 201 is defined by the flow guiding portion 21, wherein the outer assembling wall 210 is formed at an outer surface of the holding portion 23, wherein the abutting portion 22 is extended from the flow guiding portion 21 to the holding portion 23, the holding portion 23 is located outside the flow guiding portion 21, and an upper installation space 2021 and a lower installation space 2022 are defined among the flow guiding portion 21, the abutting portion 22 and the holding portion 23. The liquid taking pressing cap 40 is installed in the upper installation space 2021 of the movable flow guiding member 20. The plastic spring 12 is held in the lower installation space 2022 of the movable flow guiding member 20 in manner of being installed at the flow guiding portion 21. In other words, the movable flow guiding member 20 defines an installation space 2022 for receiving the plastic spring 12 therein. As show in FIGS. 9 to 10B, preferably, the installation space 2022 is downwardly extended form the abutting portion 22 and at least partially defined between the flow guiding portion 21 and the holding portion 23.

The assembling housing 16 of the pump main body 10 comprises an assembling portion 161 and a limiting portion 162 extended upward from the assembling portion 161, wherein the assembling portion 161 is installed at the pump housing 11, and the inner assembling wall 110 is formed at the inner surface of the limiting portion 162. The limiting portion 162 is sleeved at the movable flow guiding member 20 in the manner that the inner surface of the limiting portion 162 corresponds to the outer surface of the holding portion 23 of the movable flow guiding member 20, and the moving gap 202 is defined between the outer surface of the holding portion 23 of the movable flow guiding member 20 and the inner surface of the limiting portion 162 of the assembling housing 16.

Referring to FIGS. 9 to 10B, the liquid taking pressing cap 40 comprises a liquid outlet pressing portion 41, an installing portion 42 and a contaminant blocking portion 43, wherein the installing portion 42 is extended downward from the liquid outlet pressing portion 41, the liquid outlet channel 401 is defined by the liquid outlet pressing portion 41 and the installing portion 42, the contaminant blocking portion 43 is extended downwardly from the liquid outlet pressing portion 41, the contaminant blocking portion 43 is located outside the installing portion 42, and an anti-contamination space with an opening facing downwardly is defined between the contaminant blocking portion 43 and the installing portion 42. The liquid taking pressing cap 40 is held above the movable flow guiding member 20 and the pump main body 10 in the manner that the installing portion 42 is disposed at the upper installation space 2021 of the movable flow guiding member 20. The holding portion 23 of the movable flow guiding member 20 is located between the installing portion 42 and the contaminant blocking portion 43 of the liquid taking pressing cap 40, the contaminant blocking portion 43 of the liquid taking pressing cap 40 is located outside the holding portion 23 of the movable flow guiding member 20. An end portion of the limiting portion 162 of the assembling housing 16 of the pump main body 10 enters the anti-contamination space 402 of the liquid taking pressing cap 40, and the contaminant blocking portion 43 of the liquid taking pressing cap 40 is located outside the limiting portion 162 of the assembling housing 16.

In other words, the liquid taking pressing cap 40 is disposed to cover the movable flow guiding member 20 and the upper portion of the assembling housing 16 of the pump main body 10 in the manner that the opening of the anti-contamination space 402 is facing downwardly, and the liquid taking pressing cap 40 covers the opening of the moving gap 202 defined between the movable flow guiding member 20 and the assembling housing 16, thereby changing the extension direction of the moving gap 202. Further, the horizontal position of the opening of the anti-contamination space 402 of the liquid taking pressing cap 40 installed at the movable flow guiding member 20 and the pump main body 10 is lower than the horizontal position of the opening of the moving gap 202. In this way, when the user squeezes the liquid taking pressing cap 40 with a wet hand to take the liquid, the water flow carried by the user's hand can only flow along the outer wall of the contaminant blocking portion 43 of the liquid taking pressing cap 40, the outer wall of the assembling housing 16 of the pump main body 10 and the outer wall of the containing container 200, and cannot enter inside the full-plastic liquid pump 100 and the containing container 200, thereby avoiding external contaminants contaminating the liquid in the full-plastic liquid pump 100 and the containing container 200, so that the safety and reliability of the containing container with a full-plastic liquid pump 1000 and the full-plastic liquid pump 100 are guaranteed. It is worth mentioning that whether the liquid taking pressing cap 40 and the pump main body 10 are in a relative stationary state or a relative motion state, the liquid taking pressing cap 40 always covers the opening of the moving gap 202.

In other words, the liquid taking pressing cap 40 and the pump main body 10 always shield the outer assembling wall 210 of the movable flow guiding member 20. Specifically, the portion of the movable flow guiding member 20 which is located above the pump main body 10 is shielded by the liquid taking pressing cap 40, and the movable flow guiding member 20 is hidden inside an internal space defined by the liquid taking pressing cap 40 and the pump main body 10, to avoid external contaminants, such as dust and the like adhering to the surface of the movable flow guiding member 20, and further to prevent external contaminants from entering inside the pump main body 10 and contaminating the liquid contained in the pump main body 10.

Preferably, the contaminant blocking portion 43 of the liquid taking pressing cap 40 is in clearance fit with the limiting portion 162 of the assembling housing 16 of the pump main body 10, and during the process that the liquid taking pressing cap 40 is driven to move downwardly relative to the assembling housing 16, the liquid taking pressing cap 40 is capable of scraping off the liquid on the outer surface of the limiting portion 162 of the assembling housing 16, to avoid the water vapor generated by the liquid left on the outer surface of the assembling housing 16 from entering the inner space of the pump main body 10, which further facilitates preventing the external contaminants from entering inside the full-plastic liquid pump 100 and the containing container 200.

In some specific embodiments of the present invention, the liquid taking pressing cap 40 of the full-plastic liquid pump 100 is detachably installed at the movable flow guiding member 20. Preferably, the liquid taking pressing cap 40 is stably installed at the movable flow guiding member 20 in manner of clearance fit. Alternatively, the liquid taking pressing cap 40 is stably installed at the movable flow guiding member 20 in manner of threaded connection. In a specific embodiment of the present invention, the liquid taking pressing cap 40 is integrally molded with the movable flow guiding member 20.

In the specific embodiment of the containing container with a full-plastic liquid pump 1000 of the present invention, the full-plastic liquid pump 100 avoids corrosion of the plastic spring 12 in manner of insulating the plastic spring 12 of the pump main body 10 and the liquid, thereby preventing the liquid in the pump main body 10 and the containing container 200 from being contaminated.

Specifically, referring to FIG. 3 and FIGS. 9 to 10B, the pump main body 10 further comprises a spring holding base 17, wherein the spring holding base 17 comprises a carrying portion 171 and a holding arm 172 extended outwardly from an outer wall of the carrying portion 171, wherein the carrying portion 171 has an accommodating cavity 1701 and an assembling opening 1702 communicated with the accommodating cavity 1701. The carrying portion 171 of the spring holding base 17 is held in the liquid storage cavity 101 of the pump housing 11 in the manner that the holding arm 172 is attached at an upper edge of the pump housing 11. The movable flow guiding member 20 is held in the accommodating cavity 1701 of the carrying portion 171 in the manner that a lower end of the flow guiding portion 21 is movably held in the assembling opening 1702 of the carrying portion 171. An upper end of the spring 12 sleeved at the flow guiding portion 21 of the movable flow guiding member 20 is abutted against the abutting portion 22 of the movable flow guiding member 20, and a lower end of the plastic spring 12 is abutted against a bottom portion of the carrying portion 171 of the spring holding base 17. The piston 13 and the piston base 14 are located below the carrying portion 171 of the spring holding base 17. In other words, the piston 13 and the piston base 14 are located below the carrying portion 171 of the spring holding base 17, the piston 13 is provided with the piston base 14, wherein the piston 13 is capable of moving with respect to the piston base 14, such that when the piston 13 is in an original position, the piston 13 is capable of blocking the communicating hole 1402 of the piston base 14; when the piston 13 downwardly moves an appropriate distance, the piston 13 is capable of exposing the communicating hole 1402 of the piston base 14 to enable the communicating hole 1402 of the piston base 14 to be communicated with the communicating channel 1401 of the piston base 14 and the fluid storage chamber 101 of the pump housing 11 respectively, so as to allow the liquid in the fluid storage chamber 101 to flow into the communicating channel 1401 through the communicating hole 1402, wherein the flow guiding portion 21 of the movable flow guiding member 20 is movably and at least partially protruded out of the assembling opening 1702 of the carrying portion 171, wherein the plastic spring 12 is sleeved on the flow guiding portion 21 of the movable flow guiding member 20, and two ends of the plastic spring 12 are respectively connected with the abutting portion 22 of the movable flow guiding member 20 and the carrying portion 171 of the spring holding base 17. Further, an outer wall of the piston 13 is sealed against an inner wall of the pump housing 11, and an inner wall of the piston 13 is sealed against an outer wall of the piston base 14 to prevent liquid from contacting with the plastic spring 12.

In the process of using the full-plastic liquid pump 100, when the liquid taking pressing cap 40 is pressed downwardly, the liquid taking pressing cap 40 and the movable flow guiding member 20 connected with the liquid taking pressing cap 40 move downwardly relative to the pump main body 10, and the abutting portion 23 of the movable flow guiding member 20 and the carrying portion 171 of the spring holding base 17 compress the plastic spring 12. The flow guiding portion 21 of the movable flow guiding member 20 pushes the piston 13 and the piston base 14 to move downwardly. The friction between the outer wall of the piston 13 and the inner wall of the pump housing 11 slows down the speed of the downward movement of the piston 13, and when the piston base 14 moves downwardly relative to the piston 13 and the flow communicating hole 1402 of the piston base 14 is exposed, the flow communicating hole 1402 communicates the communicating channel 1401 of the piston base 14 with the liquid storage cavity 101 of the pump housing 11. The pressure in the liquid storage cavity 101 below the piston 13 increases, and the plastic one-way valve 15 closes the opening of the flow guiding pipe 30. Under the action of the pressure difference, the liquid in the liquid storage cavity 101 of the pump housing 11 enters into the communicating channel 1401 from the flow communicating hole 1402 of the piston base 14, and flows out from the liquid outlet channel 401 of the liquid taking pressing cap 40 after flowing through the flow guiding passage 201 of the movable flow guiding member 20.

When the pressing force received by the liquid taking pressing cap 40 is removed, the force that causes the plastic spring 12 to return to its initial position drives the movable flow guiding member 20 to move upwardly, and drives the piston 13 and the piston base 14 to move upwardly to the initial position. The piston 13 closes the flow communicating hole 1402 of the piston base 14 to block the flow of the liquid. The pressure in the liquid storage cavity 101 below the piston 13 is reduced. The plastic one-way valve 15 is opened, and the flow guiding channel 301 of the flow guiding pipe 30 is communicated with the liquid storage cavity 101 of the pump housing 11. And under the action of the pressure difference, the liquid in the liquid receiving space 200A of the containing container 200 is pressed into the liquid storage cavity 101 of the pump housing 11 through the flow guiding channel 301.

The plastic spring 12 is held above the piston 13, and the liquid entering inside the liquid storage cavity 101 of the pump housing 11 is blocked by the piston 13, so that the plastic spring 12 will never contact the liquid. In this way, the plastic spring 12 is avoided from corrosion, thereby facilitating ensuring the purity of the liquid in the liquid storage cavity 101 of the full-plastic liquid pump 100 and the liquid receiving space 200A of the containing container 200.

Further, referring to FIGS. 9 to 11B, the full-plastic liquid pump 100 is capable of being switched between a locked state and an unlocked state, wherein, the liquid taking pressing cap 40 and the movable flow guiding member 20 of the full-plastic liquid pump 100 in the locked state cannot be driven to move, thereby facilitating the storage and transportation of the containing container with a full-plastic liquid pump 1000; the liquid taking pressing cap 40 and the movable flow guiding member 20 of the full-plastic liquid pump 100 in the unlocked state are capable of being driven to move relative to the pump main body 10, thereby facilitating the users to press the liquid taking pressing cap 40 and take the liquid.

The liquid taking pressing cap 40 of the full-plastic liquid pump 100 further comprises a locking portion 44, wherein the locking portion 44 is extended downwardly from the liquid outlet pressing portion 41, and the locking portion 44 is located between the installing portion 42 and the contaminant blocking portion 43. The locking portion 44 of the liquid taking pressing cap 40 is detachably connected with the limiting portion 162 of the assembling housing 16 of the pump main body 10, so that the full-plastic liquid pump 100 is capable of being switched between the locked state and the unlocked state.

Figure 11A:
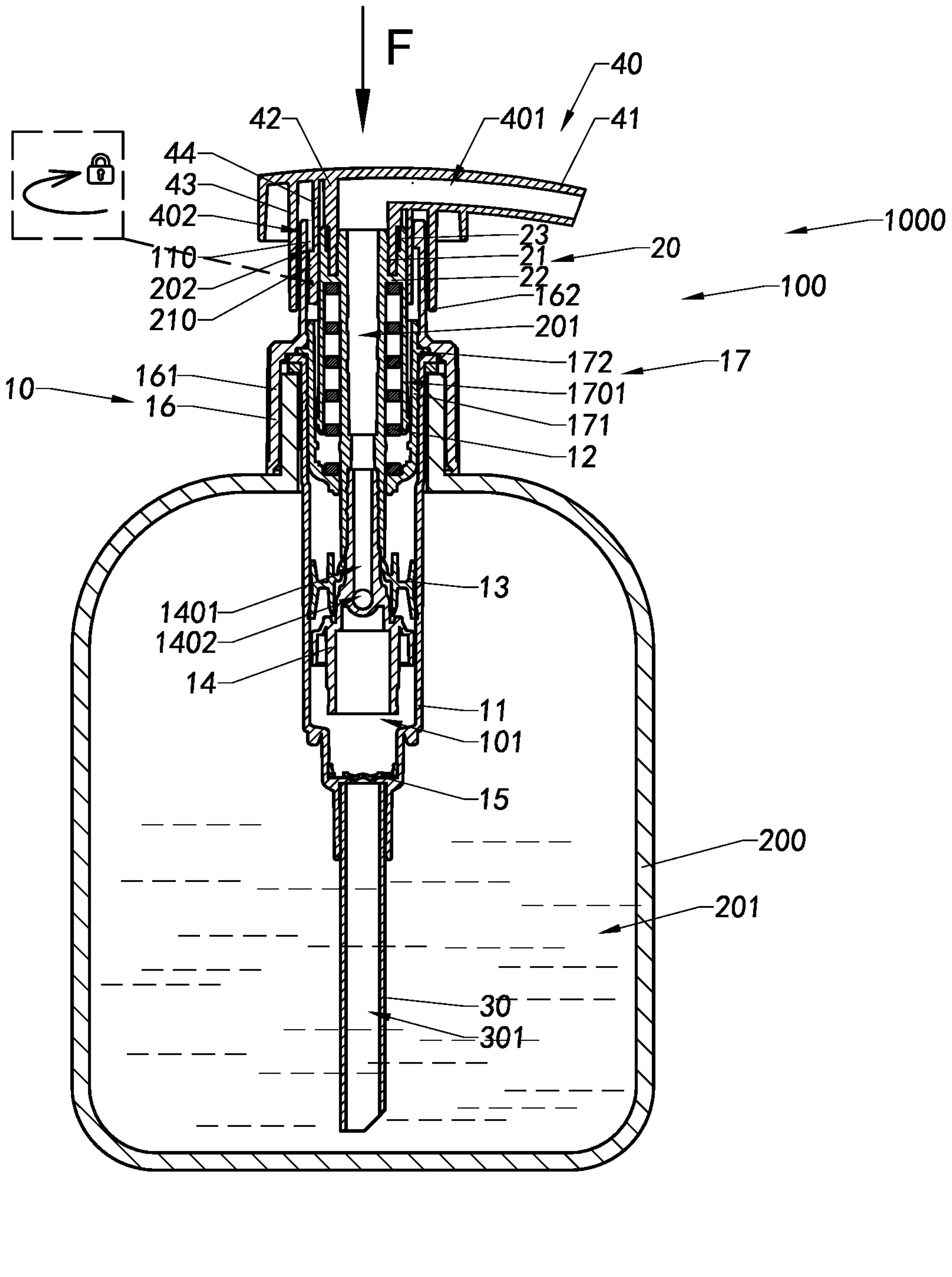
FIG. 11A is a schematic diagram of the full-plastic liquid pump of the containing container with a full-plastic liquid pump in an unlocked state according to the preferred embodiment of the present invention.

Referring to FIG. 11A, in a specific embodiment of the present invention, the locking portion 44 of the liquid taking pressing cap 40 is provided with a limiting protrusion, and the limiting portion 162 of the assembling housing 16 has a longitudinal channel and a transverse channel communicated with the longitudinal channel, wherein the longitudinal channel and the transverse channel are communicated with the assembling channel 1601. The limiting protrusion of the locking portion 44 of the liquid taking pressing cap 40 is capable of moving between the longitudinal channel and the transverse channel. The longitudinal channel penetrates longitudinally through the limiting portion 162 of the assembling housing 16, and when the limiting protrusion of the locking portion 44 of the liquid taking pressing cap 40 is located within the longitudinal channel, the liquid taking pressing cap 40 and the movable flow guiding member 20 are capable of being driven to move up and down, that is, the liquid taking pressing cap 40 is in the unlocked state at this time. When the limiting protrusion of the locking portion 44 of the liquid taking pressing cap 40 is located within the transverse channel, and the limiting protrusion is located at one side of the longitudinal channel, the inner wall of the transverse channel defined by the assembling housing 16 is used for limiting the limiting protrusion of the locking portion 44 of the liquid taking pressing cap 40. At this time, the liquid taking pressing cap 40 is stuck by the assembling housing 16, and the liquid taking pressing cap 40 and the movable flow guiding member 20 cannot move relative to the pump main body 10, that is, the full-plastic liquid pump 100 is in the locked state.

Further, the full-plastic liquid pump 100 is capable of being switched between the locked state and the unlocked state by turning the liquid taking pressing cap 40. Specifically, after turning the liquid taking pressing cap 40 of the full-plastic liquid pump 100 in the locked state to make the limiting protrusion of the locking portion 44 of the liquid taking pressing cap 40 enter the longitudinal channel from the transverse channel, the full-plastic liquid pump 100 will be switched to the unlocked state. At this time, the compressed plastic spring 12 releases the elastic potential energy, and catapults the movable flow guiding member 20 and the liquid taking pressing cap 40 upwardly. Pressing the liquid taking pressing cap 40 of the full-plastic liquid pump 100 in the unlocked state to make the liquid taking pressing cap 40 and the movable flow guiding member 20 move downwardly, then the limiting protrusion of the locking portion 44 of the liquid taking pressing cap 40 moves within the longitudinal channel, that is, the longitudinal channel can guide the movement of the liquid taking pressing cap 40 and the movable flow guiding member 20, and when the limiting protrusion moves to a position corresponding to the transverse channel, turn the liquid taking pressing cap 40 to make the limiting protrusion enter into the transverse channel from the longitudinal channel, so that the full-plastic liquid pump 100 is switched from the unlocked state to the locked state. In other words, the full-plastic liquid pump 100 realizes switching between the locked state and the unlocked state in the manner that the liquid taking pressing cap 40 is connected with the assembling housing 16 of the pump main body 10 by a snap-fit connection.

In a specific embodiment of the present invention, the limiting protrusion may also be disposed at the limiting portion 162 of the assembling housing 16 of the pump main body 10, and the longitudinal channel and the transverse channel are disposed at the locking portion 44 of the liquid taking pressing cap 40.

Figure 11B:
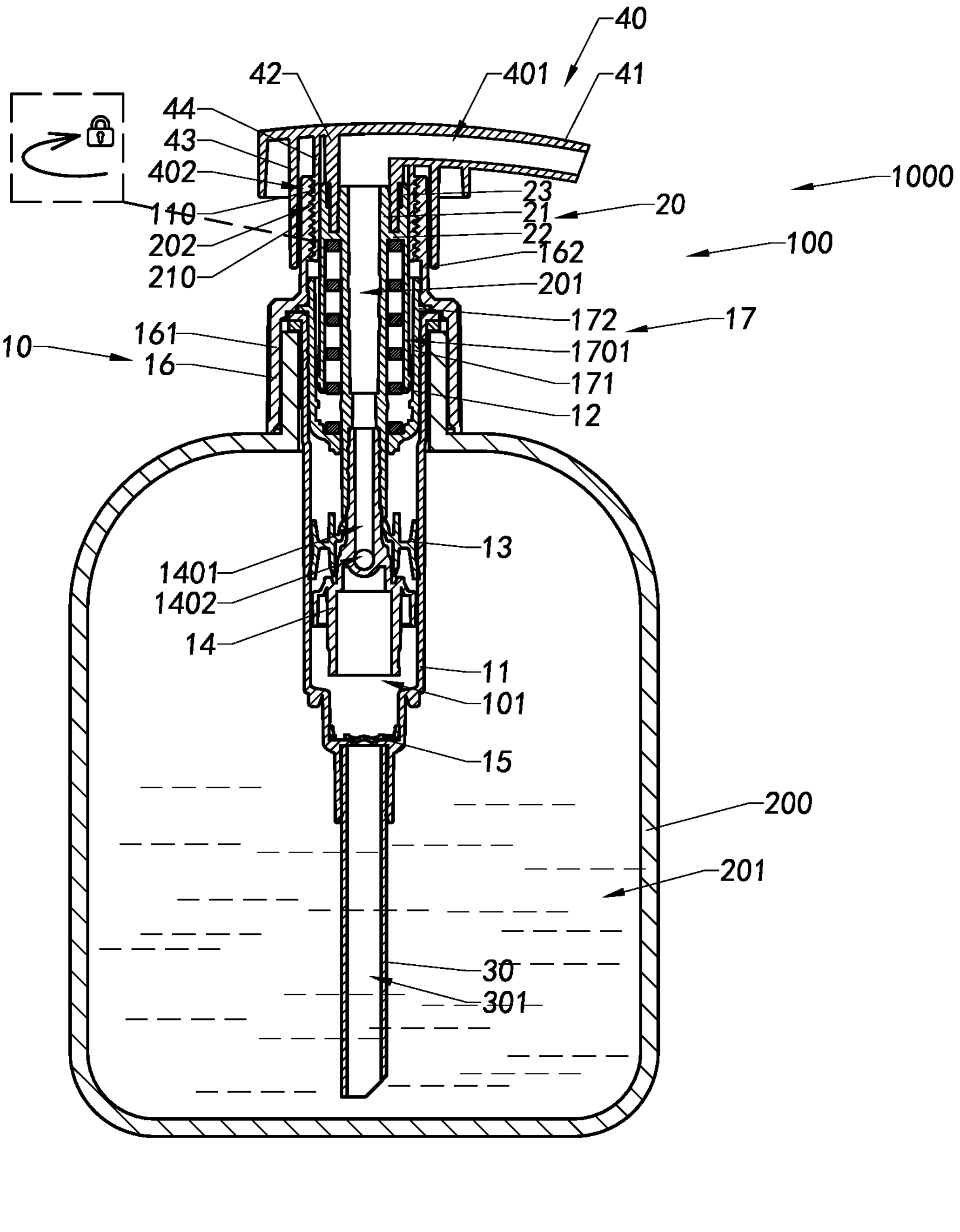
FIG. 11B is a schematic diagram of the full-plastic liquid pump of the containing container with a full-plastic liquid pump in a locked state according to the preferred embodiment of the present invention.
Figure 12:
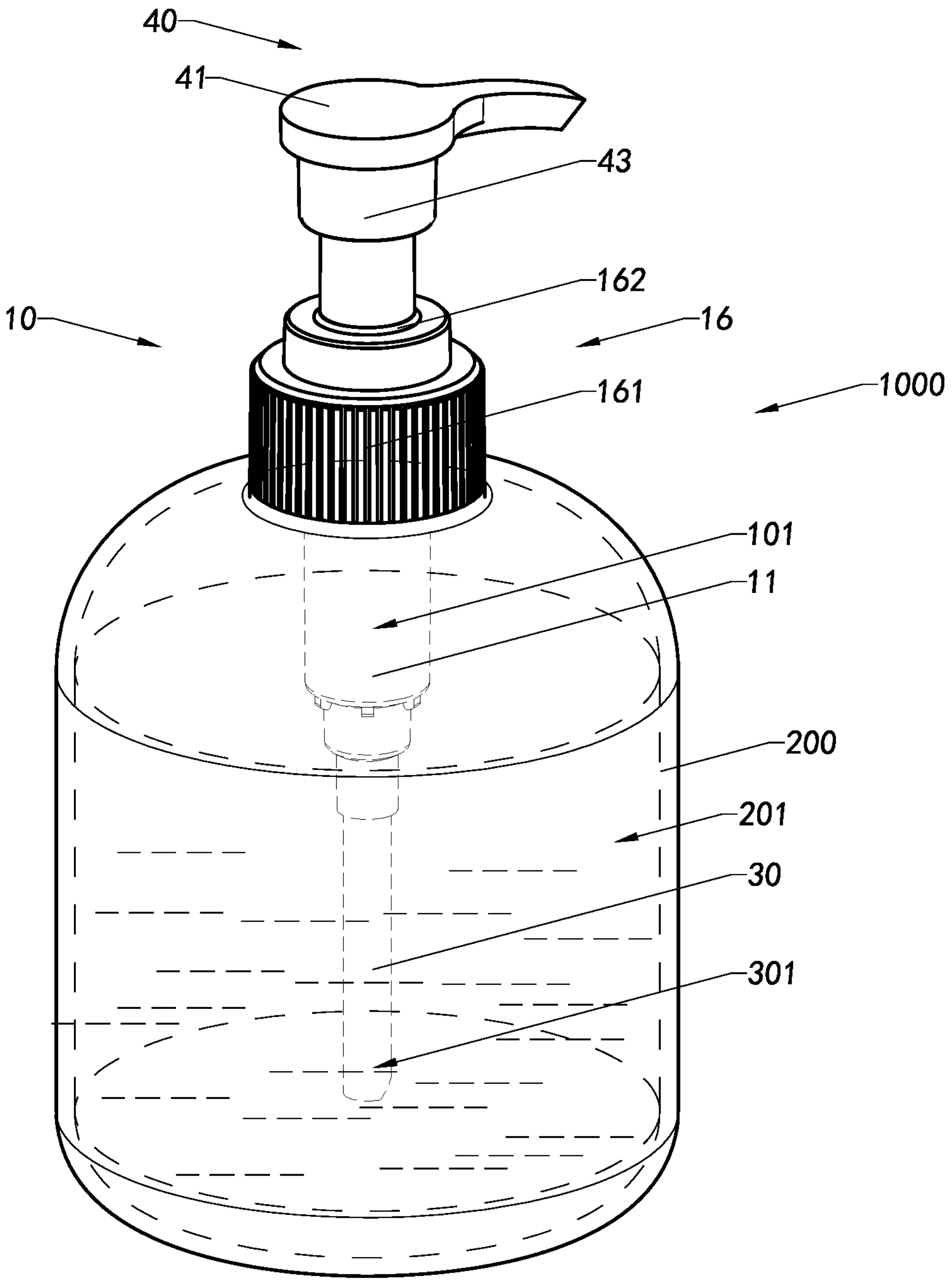
FIG. 12 is a structure diagram of the containing container with a full-plastic liquid pump according to another preferred embodiment of the present invention.

Referring to FIG. 11B, in a specific embodiment of the present invention, the locking portion 44 of the liquid taking pressing cap 40 is provided with an external thread, and the limiting portion 162 of the assembling housing 16 of the pump main body 10 is provided with an internal thread matching with the external thread. When the external thread of the locking portion 44 of the liquid taking pressing cap 40 is stably connected with the internal thread of the limiting portion 162 of the assembling housing 16, the full-plastic liquid pump 100 is in the locked state, and the liquid taking pressing cap 40 and the movable flow guiding member 20 cannot move up and down relative to the pump main body 10. After turning the liquid taking pressing cap 40 to separate the external thread of the liquid taking pressing cap 40 from the internal thread of the limiting portion 162 of the assembling housing 16, the full-plastic liquid pump 100 is switched to the unlocked state, and the liquid taking pressing cap 40 and the movable flow guiding member 20 are capable of moving up and down relative to the pump main body 10. In other words, the full-plastic liquid pump 100 realizes switching between the locked state and the unlocked state in the manner that the liquid taking pressing cap 40 is connected with the assembling housing 16 of the pump main body 10 by threaded connection.

It is worth mentioning that those skilled in the art should understand that the specific embodiment of the full-plastic liquid pump 100 being switched between the locked state and the unlocked state is only an example, and cannot be a limitation on the content and scope of the containing container with a full-plastic liquid pump 1000 and the full-plastic liquid pump 100 of the present invention.

Referring to FIGS. 12 to 19, the containing container with a full-plastic liquid pump 1000 according to another preferred embodiments of the present invention will be illustrated in the following description, wherein the containing container with a full-plastic liquid pump 1000 comprises a full-plastic liquid pump 100 and a containing container 200, wherein the full-plastic liquid pump 100 is detachably installed at the containing container 200, and the liquid in a liquid receiving space 200A of the containing container 200 can be obtained in manner of pressing the full-plastic liquid pump 100. Further, in the process of pressing to take the liquid, the liquid attached to the outer wall of the full-plastic liquid pump 100 can be scraped off to avoid the external contaminants entering into the inner space of the full-plastic liquid pump 100 and the containing container 200, thereby ensuring the cleanliness of the liquid contained in the containing container with a full-plastic liquid pump 1000, and improving the safety and reliability of the containing container with a full-plastic liquid pump 1000.

Figure 13:
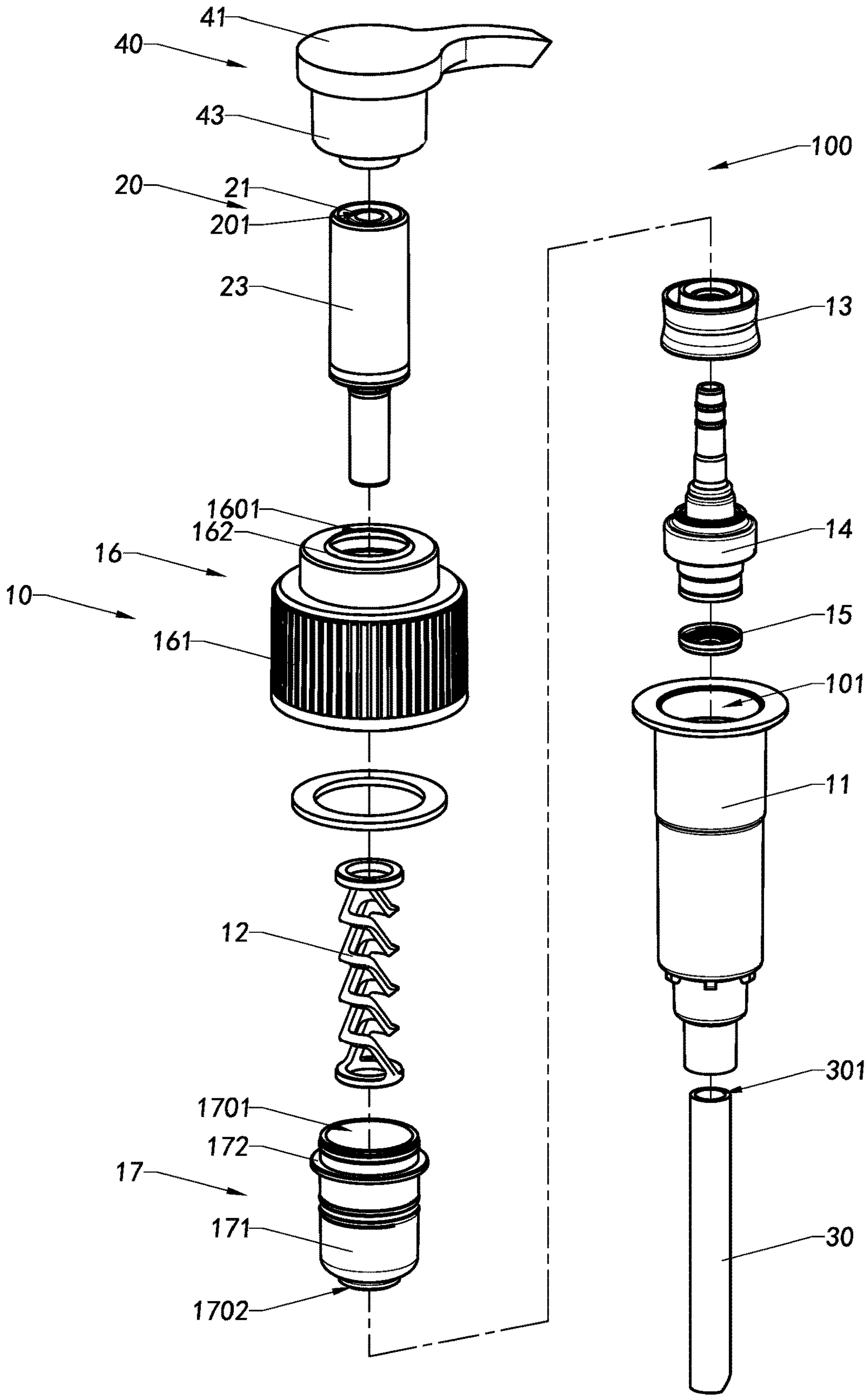
FIG. 13 is an exploded view of the full-plastic liquid pump of the containing container with a full-plastic liquid pump according to the above another preferred embodiment of the present invention.

Specifically, referring to FIG. 13, the full-plastic liquid pump 100 comprises a pump main body 10, a movable flow guiding member 20, a flow guiding pipe 30 and a liquid taking pressing cap 40, wherein the pump main body 10 has a liquid storage cavity 101, wherein the movable flow guiding member 20 has a flow guiding passage 201, wherein the flow guiding pipe 30 has a flow guiding channel 301, and the liquid taking pressing cap 40 has a liquid outlet channel 401. The movable flow guiding member 20 is movably installed at the pump main body 10 in manner of clearance fit, and the flow guiding passage 201 of the movable flow guiding member 20 is selectively communicated with the liquid storage cavity 101 of the pump main body 10. The flow guiding pipe 30 is installed at the pump main body 10, and the flow guiding channel 301 of the flow guiding pipe 30 is selectively communicated with the liquid storage cavity 101 of the pump main body 10. The pump main body 10 is detachably installed at the containing container 200, and the flow guiding channel 301 of the flow guiding pipe 30 is communicated with the liquid receiving space 200A of the containing container 200. The liquid taking pressing cap 40 is disposed at the movable flow guiding member 20 in the manner that the liquid outlet channel 401 is communicated with the movable flow guiding member 20.

Specifically, the movable flow guiding member 20 has an outer assembling wall 210, and the pump main body 10 has an inner assembling wall 110, wherein the movable flow guiding member 20 is movably installed at the pump main body 10 in the manner that the outer assembling wall 210 is attached with the inner assembling wall 110 of the pump main body 10. The liquid taking pressing cap 40 can be driven to move downwardly relative to the pump main body 10 by riving the movable flow guiding member 20 to move, while the pump main body 10 moves upwardly relative to the movable flow guiding member 20 at the same time. In the process that the pump main body 10 moves upwardly relative to the movable flow guiding member 20, the pump main body 10 is capable of scraping off the liquid attached at the outer assembling wall 210 of the movable flow guiding member 20 to avoid the liquid entering inside the pump main body 10 and the containing container 200.

The pump main body 10 comprises a pump housing 11, a plastic spring 12, a piston 13, a piston base 14, a plastic one-way valve 15 and an assembling housing 16, wherein the liquid storage cavity 101 is defined by the pump main body 11, wherein the piston base 14 has a communicating channel 1401 and a flow communicating hole 1402 communicated with the communicating channel 1401, wherein the assembling housing 16 has an assembling channel 1601.

The piston 13 is installed at the piston base 14 in a manner of shielding the flow communicating hole 1402 of the piston base 14, and the piston 13 is capable of moving relative to the piston base 14. The outer wall of the piston 13 is capable of being attached with the inner wall of the pump housing 11 to block the flow of liquid and air. The piston base 14 is installed at the movable flow guiding member 20 in the manner that the communicating channel 1401 is communicated with the flow guiding passage 201 of the movable flow guiding member 20. The plastic spring 12 is sleeved at the movable flow guiding member 20, and the plastic spring 12 is capable of driving the movable flow guiding member 20, the piston 13 and the piston base 14 to move. The pump housing 11 is disposed at the flow guiding pipe 30. Preferably, the flow guiding pipe 30 is detachably installed at the pump housing 11 of the pump main body 10. Alternatively, the flow guiding pipe 30 is integrally molded with the pump housing 11 of the pump main body 10. The plastic one-way valve 15 is movably disposed between the pump housing 11 and the flow guiding pipe 30, and the plastic one-way valve 15 is capable of closing or opening the opening of the flow guiding pipe 30. The pump housing 11 and the movable flow guiding member 20 are installed at the assembling channel 1601 of the assembling housing 16, and the full-plastic liquid pump 100 is detachably installed at the containing container 200 through the assembling housing 16. Preferably, the assembling housing 16 is installed at the containing container 200 in a manner of threaded connection.

Figure 17:
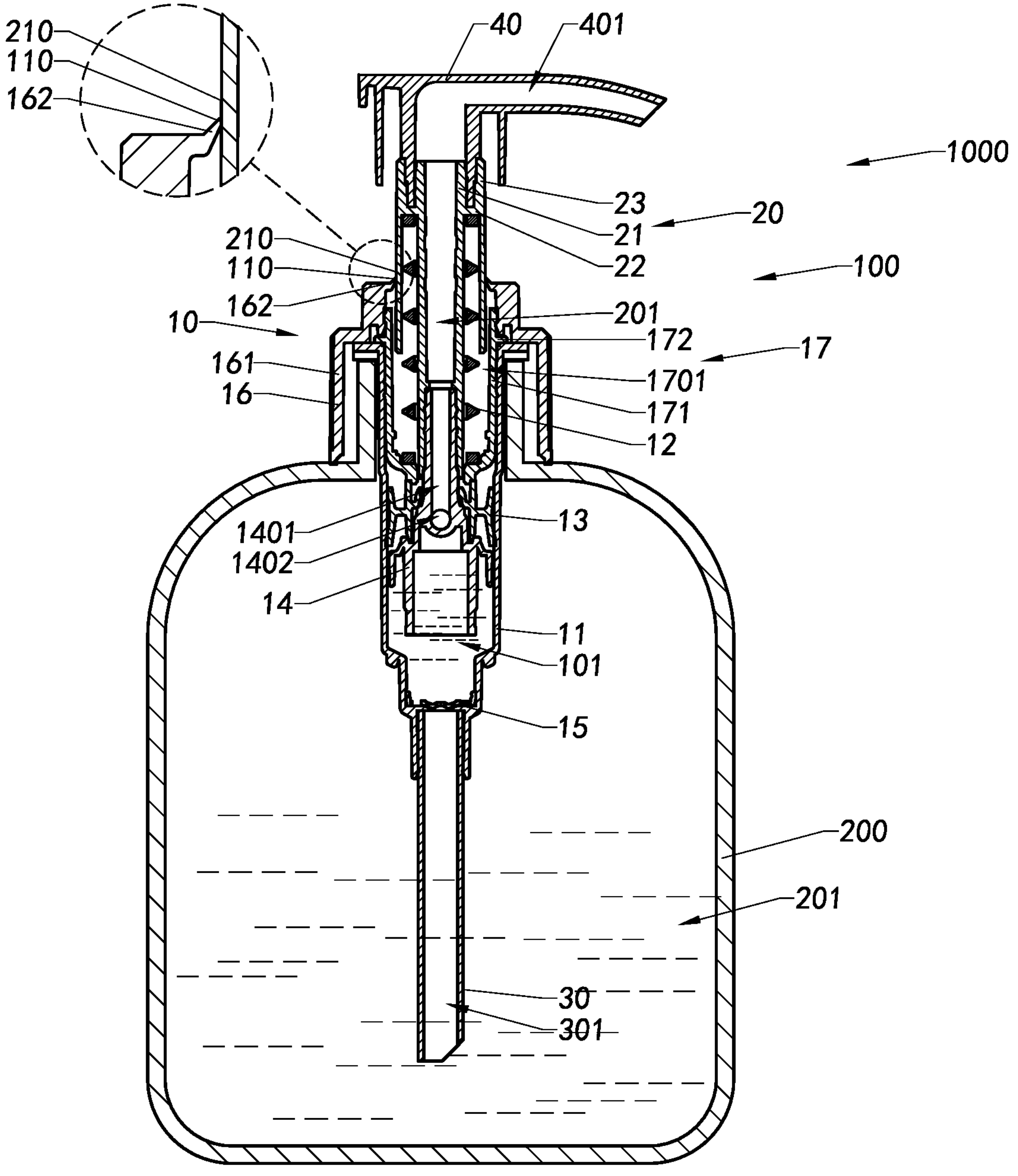
FIG. 17 is a sectional view of the containing container with a full-plastic liquid pump according to the above another preferred embodiment of the present invention.
Figure 18A:
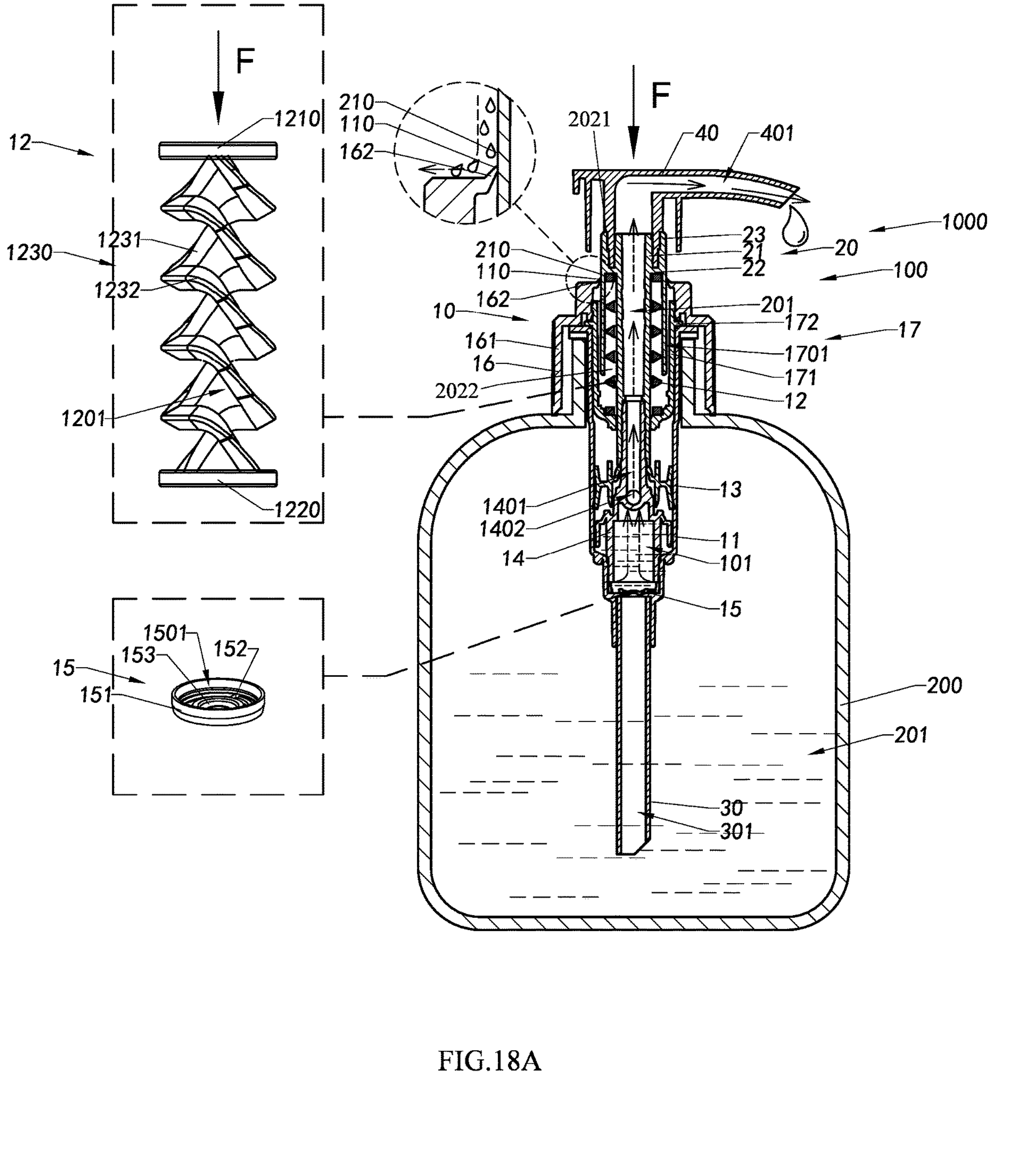
FIG. 18A is an application schematic diagram of the containing container with a full-plastic liquid pump according to the above another preferred embodiment of the present invention.
Figure 18B:
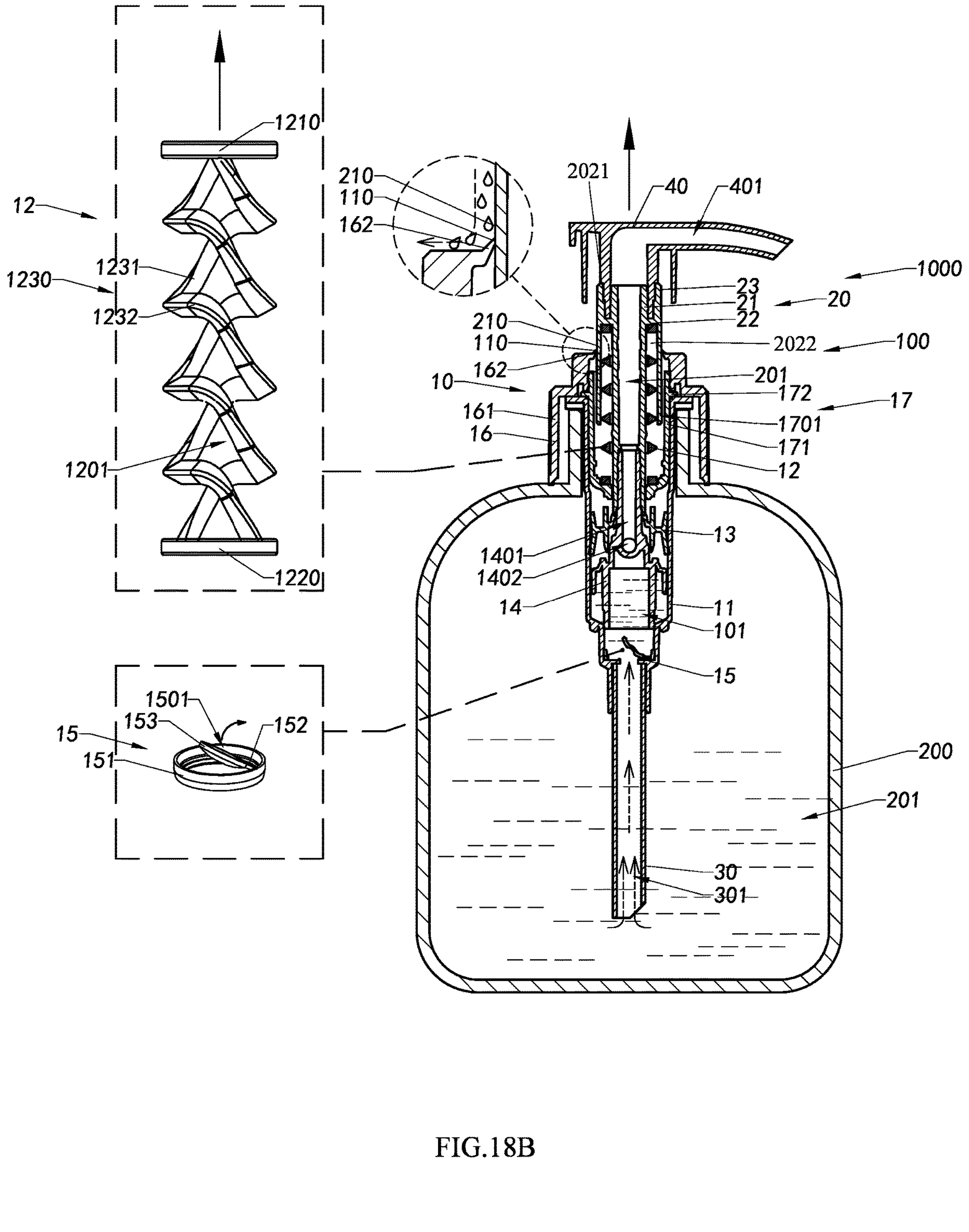
FIG. 18B is an application schematic diagram of the containing container with a full-plastic liquid pump according to the above another preferred embodiment of the present invention.
Figure 19:
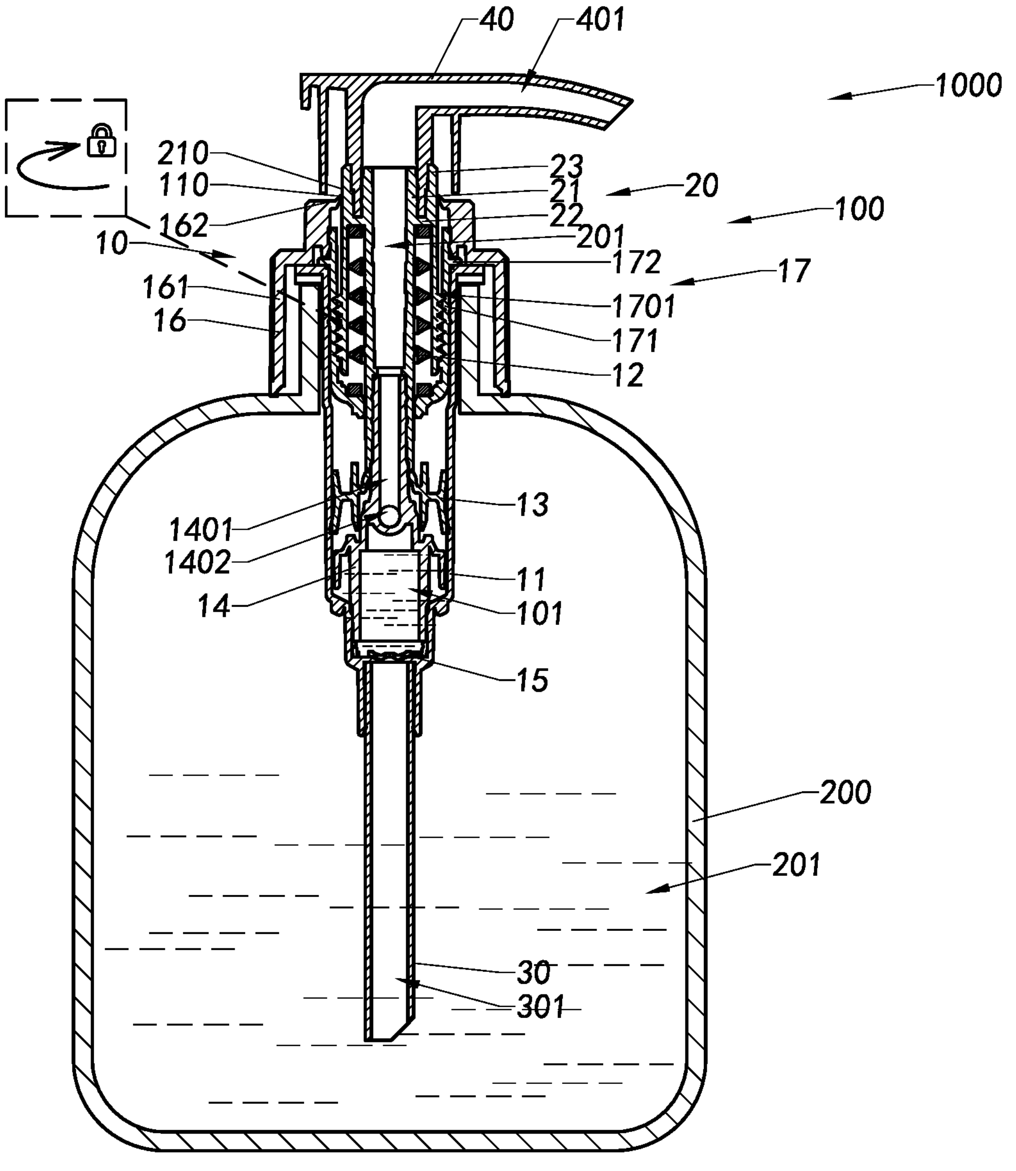
FIG. 19 is a schematic diagram of the full-plastic liquid pump of the containing container with a full-plastic liquid pump in a locked state according to the above another preferred embodiment of the present invention.

Referring to FIGS. 17 to 19, the movable flow guiding member 20 comprises a flow guiding portion 21, an abutting portion 22 and a holding portion 23, wherein the flow guiding passage 201 is defined by the flow guiding portion 21, wherein the abutting portion 22 is extended from the flow guiding portion 21 to the holding portion 23, the holding portion 23 is located outside the flow guiding portion 21, and an upper installation space 2021 and a lower installation space 2022 are defined among the flow guiding portion 21, the abutting portion 22 and the holding portion 23. The outer assembling wall 210 of the movable flow guiding member 20 is provided at the outer surface of the holding portion 23. The liquid taking pressing cap 40 is installed at the upper installation space 2021 of the movable flow guiding member 20. The plastic spring 12 is provided at the lower installation space 2022 of the movable flow guiding member 20 in manner of being installed at the flow guiding portion 21.

The assembling housing 16 comprises a housing main body 161 and a contaminant scraping arm 162 held inclinedly above the housing main body 161, and the inner assembling wall 110 of the pump main body 10 is formed on the inner surface of the contaminant scraping arm 162. The movable flow guiding member 20 is movably held in the assembling channel 1601 of the assembling housing 16 in the manner that the outer surface of the holding portion 23 is attached at the inner surface of the contaminant scraping arm 162. The outer surface of the holding portion 13 of the movable flow guiding member 20 is connected with the inner surface of the contaminant scraping arm 162 of the assembling housing 16 by clearance fit, which facilitates preventing the water flow from entering inside the liquid storage cavity 101 of the pump housing 11 and liquid receiving space 200A of the containing container 200 from the position between the movable flow guiding member 20 and the assembling housing 16.

Referring to FIG. 12 and FIGS. 17 to 19, in a specific embodiment of the present invention, the contaminant scraping arm 162 is integrally molded with the housing main body 161, that is, the contaminant scraping arm 162 is inclinedly and integrally extended upwardly from the shell body 161.

Figure 20:
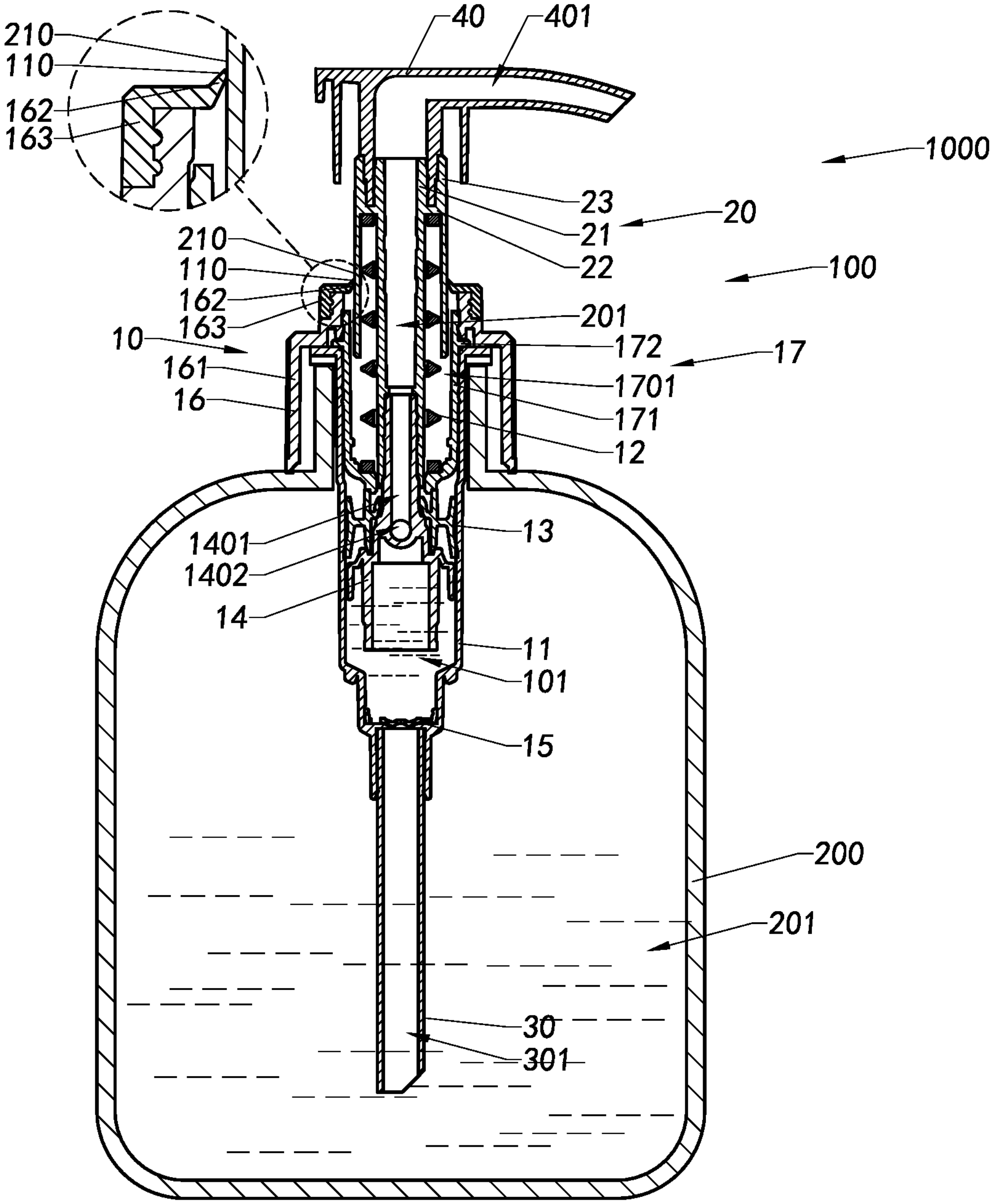
FIG. 20 is a schematic diagram of a deformation embodiment of the full-plastic liquid pump of the containing container with a full-plastic liquid pump according to the above another preferred embodiment of the present invention.
Figure 21:
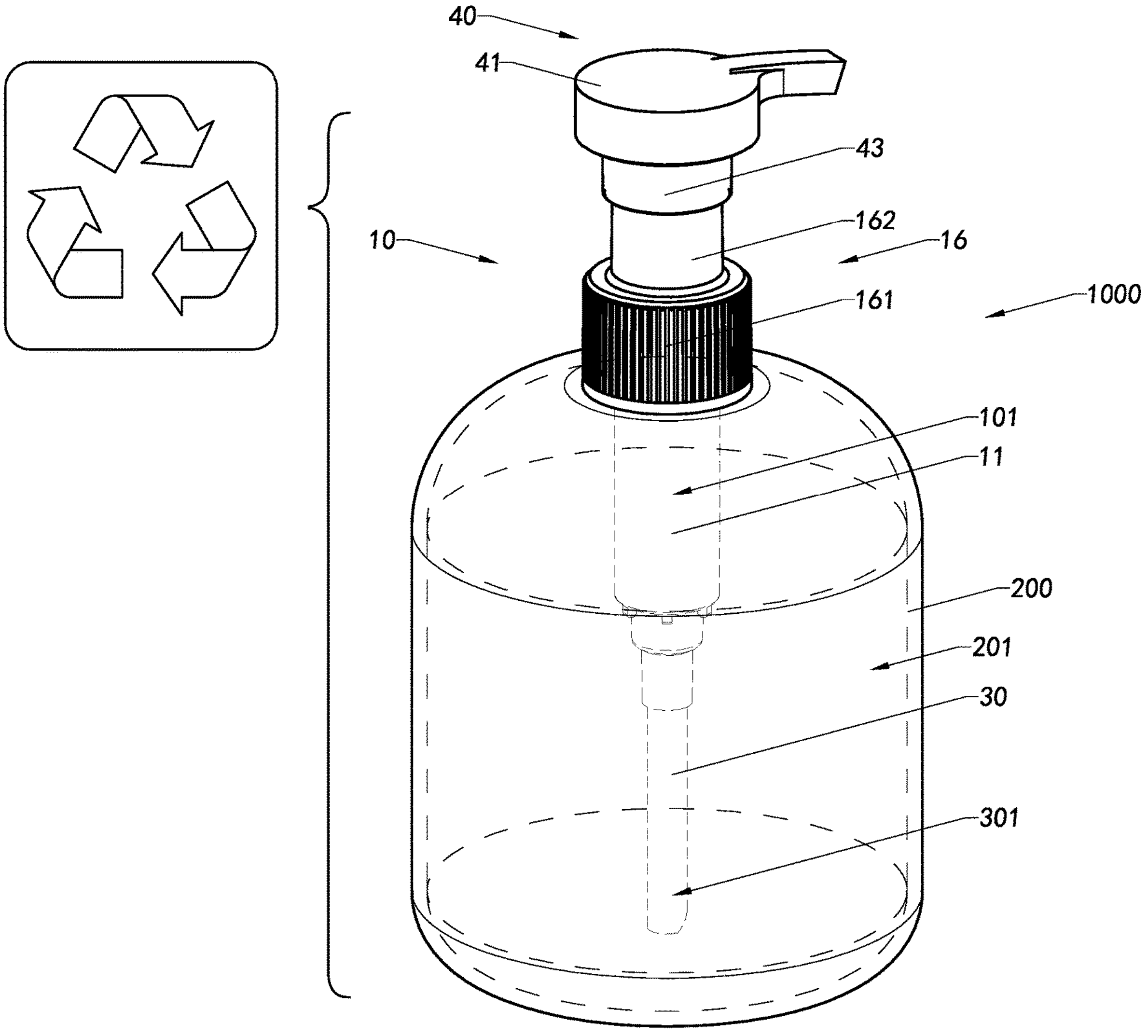
FIG. 21 is an application schematic diagram of the containing container with a full-plastic liquid pump according to a preferred embodiment of the present invention.

Referring to FIG. 20, in another specific embodiment of the present invention, the contaminant scraping arm 162 and the housing main body 161 are implemented as a split-type structure, and the contaminant scraping arm 162 may be installed at the shell body 161. Specifically, the assembling housing 16 further comprises a connecting member 163, wherein the contaminant scraping arm 162 is inclinedly extended upwardly from the connecting member 163 and forms a contaminant protecting covering. The connecting member 163 is fixed to the housing main body 161 in manner of being sleeved at the housing main body 161, and the contaminant scraping arm 162 is held above the housing main body 161. The movable flow guiding member 20 is movably held in the assembling channel 1601 of the assembling housing 16 in the manner that the outer surface of the holding portion 23 is attached at the inner surface of the contaminant scraping arm 162. For example, the connecting member 163 is detachably installed at the housing main body 161 in the manner comprising but not limited to gap fit, threaded connection, etc. The existing emulsion pump can also achieve the effect of anti-contamination by installing the contaminant protecting covering with fitted size at the existing emulsion pump. Those skilled in the art should understand that the specific connection method of the contaminant scraping arm 162 and the housing main body 161 is only for illustration, and cannot be a limitation on the content and scope of the containing container with a full-plastic liquid pump 1000 and the full-plastic liquid pump 100 of the present invention.

Further, referring to FIG. 18A and FIG. 18B, the contaminant scraping arm 162 has an inclined outer wall relative to the inner assembling wall 110, and the inclined outer wall is inclinedly extended downwardly relative to the holding portion 23 of the movable flow guiding member 20. In the process that the movable flow guiding member 20 is driven to move downwardly relative to the pump main body 10, the liquid attached to the outer surface of the holding portion 23 of the movable flow guiding member 20 flows rapidly down along the inclined outer wall of the contaminant scraping arm 162 after being scraped by the contaminant scraping arm 162, which further facilitates the rapid removal of the liquid attached to the outer assembling wall 210 of the movable flow guiding member 20.

In some specific embodiments of the present invention, the liquid taking pressing cap 40 of the full-plastic liquid pump 100 is detachably installed at the movable flow guiding member 20. Preferably, the liquid taking pressing cap 40 is stably installed at the movable flow guiding member 20 in manner of clearance fit. Alternatively, the liquid taking pressing cap 40 is stably installed at the movable flow guiding member 20 in manner of threaded connection. In a specific embodiment of the present invention, the liquid taking pressing cap 40 is integrally molded with the movable flow guiding member 20.

In the specific embodiment of the containing container with a full-plastic liquid pump 1000 of the present invention, the full-plastic liquid pump 100 avoids corrosion of the plastic spring 12 in manner of insulating the plastic spring 12 of the pump main body 10 from the liquid, thereby preventing the liquid in the pump main body 10 and the containing container 200 from being contaminated.

Specifically, referring to FIG. 13 and FIGS. 17 to 20, the pump main body 10 further comprises a spring holding base 17, wherein the spring holding base 17 comprises a carrying portion 171 and a holding arm 172 extended outwardly from the outer wall of the carrying portion 171, wherein the carrying portion 171 has an accommodating cavity 1701 and an assembling opening 1702 communicated with the accommodating cavity 1701. The carrying portion 171 of the spring holding base 17 is held in the liquid storage cavity 101 of the pump housing 11 in the manner that the holding arm 172 is attached at the upper edge of the pump housing 11. The movable flow guiding member 20 is held in the accommodating cavity 1701 of the carrying portion 171 in the manner that the lower end of the flow guiding portion 21 is movably held in the assembling opening 1702 of the carrying portion 171. The upper end of the spring 12 sleeved at the flow guiding portion 21 of the movable flow guiding member 20 is abutted against the abutting portion 22 of the movable flow guiding member 20, and the lower end of the plastic spring 12 is abutted against the bottom portion of the carrying portion 171 of the spring holding base 17. The piston 13 and the piston base 14 are located below the carrying portion 171 of the spring holding base 17.

Referring to the FIG. 18A and FIG. 18B, in the process of using the full-plastic liquid pump 100, when the liquid taking pressing cap 40 is pressed downwardly, the liquid taking pressing cap 40 and the movable flow guiding member 20 connected with the liquid taking pressing cap 40 move downwardly relative to the pump main body 10, and the abutting portion 23 of the movable flow guiding member 20 and the carrying portion 171 of the spring holding base 17 extrude the plastic spring 12. The flow guiding portion 21 of the movable flow guiding member 20 pushes the piston 13 and the piston base 14 to move downwardly. The friction between the outer wall of the piston 13 and the inner wall of the pump housing 11 reduces the speed of the downward movement of the piston 13, and when the piston base 14 downwardly moves relative to the piston 13 and the flow communicating hole 1402 of the piston base 14 is exposed, the flow communicating hole 1402 can be communicated with the communicating channel 1401 of the piston base 14 and the liquid storage cavity 101 of the pump housing 11 respectively. The pressure in the liquid storage cavity 101 below the piston 13 increases, and the plastic one-way valve 15 closes the opening of the flow guiding pipe 30. Under the action of the pressure difference, the liquid in the liquid storage cavity 101 of the pump housing 11 enters the communicating channel 1401 through the flow communicating hole 1402 of the piston base 14, and flows out from the liquid outlet channel 401 of the liquid taking pressing cap 40 after flowing through the flow guiding passage 201 of the movable flow guiding member 20.

When the pressing force received by the liquid taking pressing cap 40 is removed, the force of the plastic spring 12 which causes the plastic spring 12 to return to the initial position drives the movable flow guiding member 20 to move upwardly, and drives the piston 13 and the piston base 14 to move upwardly to the initial position. The piston 13 blocks the flow communicating hole 1402 of the piston base 14 to prevent the flow of the liquid flowing between the pump housing 11 and the movable flow guiding member 20. The pressure in the liquid storage cavity 101 below the piston 13 is reduced. The plastic one-way valve 15 is opened, and the flow guiding channel 301 of the flow guiding pipe 30 is communicated with the liquid storage cavity 101 of the pump housing 11. And under the action of the pressure difference, the liquid in the liquid receiving space 200A of the containing container 200 is pressed to flow into the liquid storage cavity 101 of the pump housing 11 from the flow guiding channel 301.

The plastic spring 12 is held above the piston 13, and the liquid entering into the liquid storage cavity 101 of the pump housing 11 is blocked by the piston 13, so that the plastic spring 12 is always insulated with the liquid. In this way, the plastic spring 12 is avoided from corrosion, thereby facilitating ensuring the purity of the liquid in the liquid storage cavity 101 of the full-plastic liquid pump 100 and the liquid receiving space 200A of the containing container 200.

Figure 7:
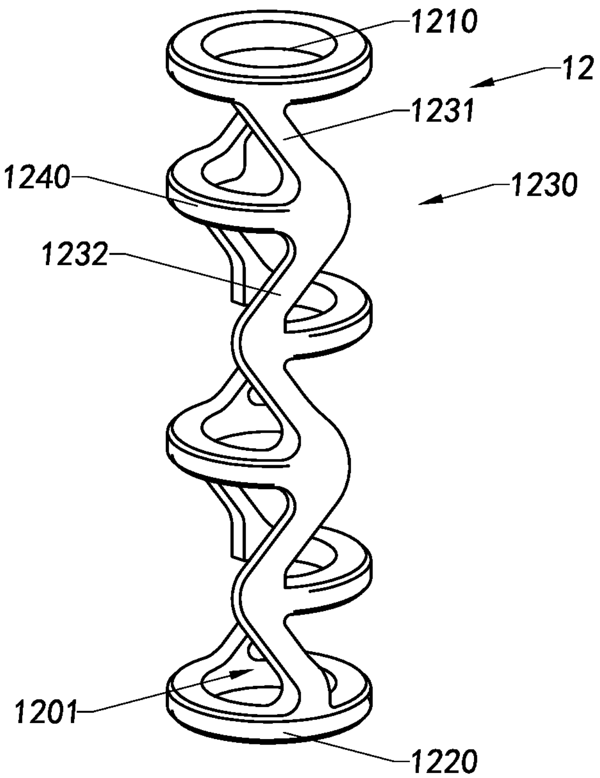
FIG. 7 is a schematic diagram of another modification embodiment of the plastic spring of the full-plastic liquid pump according to the above preferred embodiment of the present invention.

Further, referring to FIG. 7 and FIG. 19, the full-plastic liquid pump 100 is capable of being switched between a locked state and an unlocked state, wherein, the liquid taking pressing cap 40 and the movable flow guiding member 20 of the full-plastic liquid pump 100 in the locked state cannot be driven to move, thereby facilitating the storage and transportation of the containing container with a full-plastic liquid pump 1000; the liquid taking pressing cap 40 and the movable flow guiding member 20 of the full-plastic liquid pump 100 in the unlocked state are capable of being driven to move relative to the pump main body 10, thereby facilitating them being pressed and the liquid being token by the users.

Referring to FIG. 19, in the specific embodiment of the present invention, the lower portion of the holding portion 23 of the movable flow guiding member 20 is provided with a limiting portion 231, and the lower portion of the carrying portion 171 of the spring holding base 17 is provided with a locking portion 1711. The holding portion 23 of the movable flow guiding member 20 is movably held inside the accommodating cavity 1701 of the carrying portion 171, and the limiting portion 231 of the holding portion 23 and the locking portion 1711 of the carrying portion 171 cooperate with each other, so that the full-plastic liquid pump 100 is capable of switching between the locked state and the unlocked state.

Preferably, the limiting portion 231 of the movable flow guiding member 20 is implemented as an external thread, and the locking portion 1711 of the carrying portion 171 of the spring holding base 17 is implemented as an internal thread matched with the external thread. When the movable flow guiding member 20 is driven to move downwardly, and the limiting portion 231 of the movable flow guiding member 20 is stably connected with the locking portion 1711 of the carrying portion 171 of the spring holding base 17, the full-plastic liquid pump 100 is in the locked state, and the liquid taking pressing cap 40 and the movable flow guiding member 20 cannot move up and down relative to the pump main body 10. After turning the movable flow guiding member 20 to separate the external thread from the internal thread, the full-plastic liquid pump 100 is switched to the unlocked state, and the liquid taking pressing cap 40 and the movable flow guiding member 20 are capable of moving up and down relative to the pump main body 10. In other words, the full-plastic liquid pump 100 realizes switching between the locked state and the unlocked state in the manner that the movable flow guiding member 20 is connected with the spring holding base 17 by threaded connection.

Alternatively, the full-plastic liquid pump 100 realizes switching between the locked state and the unlocked state in the manner that the movable flow guiding member 20 is connected with the spring holding base 17 by snap-fit connection. It is worth mentioning that those skilled in the art should understand that the specific embodiment achieving the full-plastic liquid pump 100 switching between the locked state and the unlocked state is only an example, and cannot be a limitation on the content and scope of the containing container with a full-plastic liquid pump 1000 and the full-plastic liquid pump 100 of the present invention.

Referring to FIGS. 4 to 7 and FIGS. 14 to 16D, in the specific embodiment of the full-plastic liquid pump 100 of the present invention, the plastic spring 12 of the full-plastic liquid pump 100 comprises an upper maintaining portion 1210, a lower maintaining portion 1220 and at least one elastic portion 1230, wherein the elastic portion 1230 is extended deformably and integrally from the upper maintaining portion 1210 to the lower maintaining portion 1220, and an installing channel 1201 is defined among the upper maintaining portion 1210, the lower maintaining portion 1220 and the elastic portion 1230, wherein the installing channel 1201 has one opening formed at the upper maintaining portion 1210 and another opening formed at the lower maintaining portion 1220, wherein the flow guiding portion 21 of the movable flow guiding member 20 is held in the installing channel 1201 of the plastic spring 12. During the process that the upper maintaining portion 1210 and the lower maintaining portion 1220 are driven to get close to each other, the upper maintaining portion 1210 and the lower maintaining portion 1220 squeeze the elastic portion 1230, to make the elastic portion 1230 generate an elastic deformation, and accumulate elastic potential energy. When the external force received by the upper maintaining portion 1210 and the lower maintaining portion is removed, the elastic portion 1230 releases the elastic potential energy and returns to the initial state.

The upper maintaining portion 1210, the lower maintaining portion 1220 and the elastic portion 1230 of the plastic spring 12 may be integrally molded in manner of injection molding, with low manufacturing cost and fast production cycle, which facilitates reducing the production cost of the full-plastic liquid pump. Further, the type of plastic material used to manufacture the plastic spring 12 may be selected from polyethylene, polypropylene or materials known to those skilled in the art. The specific composition of the plastic spring 12 is not limited.

Preferably, the number of the elastic portion 1230 is implemented as two, the two elastic portions 1230 are held between the upper maintaining portion 1210 and the lower maintaining portion 1220 spacedly, to prevent the plastic spring 12 from skewing laterally when being squeezed, which facilitates improving the stability of the plastic spring 12. More preferably, the two elastic portions 1230 are symmetrically disposed. For example, the two elastic portions 1230 are centrally symmetrical relative to the central axis of the plastic spring 12 regarded as the symmetrical axis.

It is worth mentioning that the specific number of the elastic portion 1230 is not limited, wherein the elastic portion 1230 may also be implemented as one or more than three, and the plastic spring 30 may have different elasticities to suit different products by setting different numbers of the elastic portion 1230. It should be noted that if the number of elastic portions 1230 of the plastic spring 12 is three or more, these elastic portions 1230 are disposed between the upper maintaining portion 1210 and the lower maintaining portion 1220 spacedly, and the distances between any adjacent two elastic portions 1230 are equal.

Figure 16A:
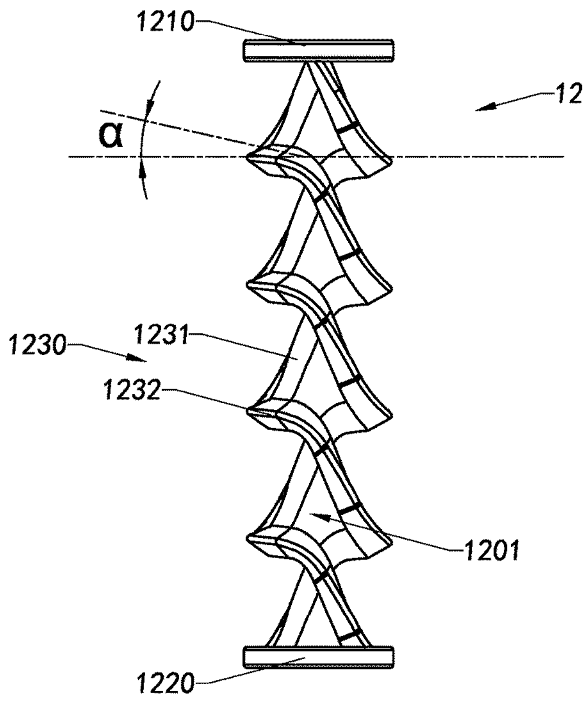
FIG. 16A is a structure diagram of a deformation embodiment of the plastic spring of the full-plastic liquid pump of the containing container with a full-plastic liquid pump according to the above another preferred embodiment of the present invention.
Figure 16B:
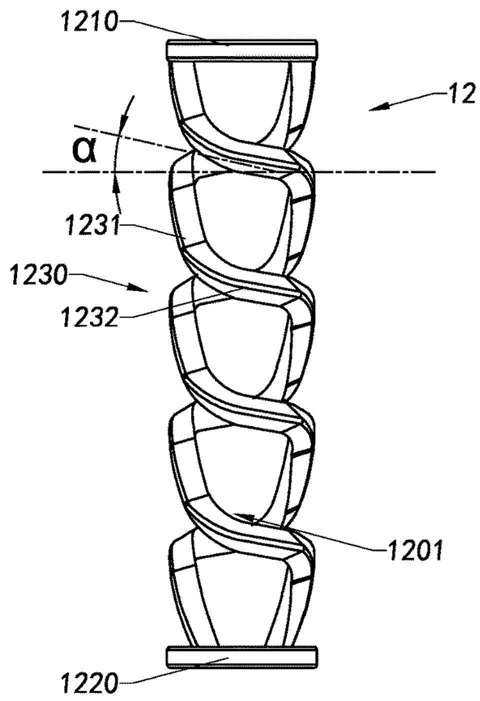
FIG. 16B is a structure diagram of the above deformation embodiment of the plastic spring of the full-plastic liquid pump of the containing container with a full-plastic liquid pump according to the above another preferred embodiment of the present invention.
Figure 16C:
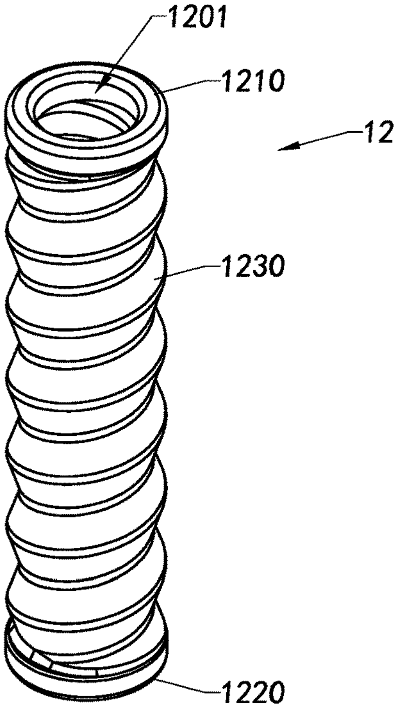
FIG. 16C is a structure diagram of another deformation embodiment of the plastic spring of the full-plastic liquid pump of the containing container with a full-plastic liquid pump according to the above another preferred embodiment of the present invention.
Figure 16D:
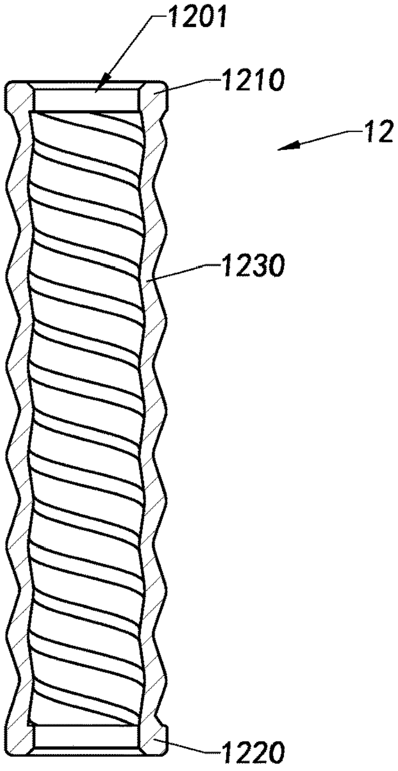
FIG. 16D is a sectional view of the above deformation embodiment of the plastic spring of the full-plastic liquid pump of the containing container with a full-plastic liquid pump according to the above another preferred embodiment of the present invention.

Referring to FIG. 16C and FIG. 16D, preferably, the elastic portion 1230 is implemented as one. For example, the elastic portion 1230 is a waveform tubular structure.

In the using process of the liquid pump 100, when pressing the liquid taking pressing cap 40 of the liquid pump 100, the upper maintaining portion 1210 and the lower maintaining portion 1220 of the spring 12 are close to each other to squeeze the two elastic portions 1230, so that the two elastic portions 1230 are compressed in manner of generating deformation, and accumulate the elastic potential energy. When the external force received by the liquid taking pressing cap 40 is removed, the elastic portion 1230 of the spring 12 releases the elastic potential energy, and drives the movable flow guiding member 20, the liquid taking pressing cap 40, the piston 13 and the piston base 14 to move upwardly and return to the initial position.

In a specific embodiment of the present invention, the upper maintaining portion 1210 and the lower maintaining portion 1220 are kept parallel to each other, and the upper maintaining portion 1210 and the lower maintaining portion 1220 are parallel to the horizontal plane. When the upper maintaining portion 1210 is subjected to a vertical downward pressing force, the upper maintaining portion 1210 is uniformly forced, which facilitates uniformly driving the elastic portion 1230 to generate deformation and be compressed downwardly. Alternatively, the upper maintaining portion 1210 and the lower maintaining portion 1220 may also be implemented as non-parallel. Alternatively, the upper maintaining portion 1210 and the lower maintaining portion 1220 may also be implemented as having an angle of inclination between it and the horizontal plane. Preferably, the extending direction of the upper maintaining portion 1210 is the same as the extending direction of the lower maintaining portion 1220. Alternatively, the extending direction of the upper maintaining portion 1210 is different from the extending direction of the lower maintaining portion 1220. For example, the upper maintaining portion 1210 may be implemented to extend upwardly and inclinedly, and the lower maintaining portion 1220 may be implemented to extend downwardly obliquely and inclinedly.

In the specific embodiment of the plastic spring 12 of the present invention, the upper maintaining portion 1210 and the lower maintaining portion 1220 are implemented as being circular ring or square, triangle, oval, rhombus, semicircular arc, trapezoid, etc. and having a through hole. Alternatively, In other specific embodiments of the plastic spring 12 of the present invention, the upper maintaining portion 1210 and the lower maintaining portion 1220 are implemented as a "C" shape, a "V" shape, a "U" shape, a "[" shape, etc. Those skilled in the art should understand that the specific embodiments of the upper maintaining portion 1210 and the lower maintaining portion 1220 of the plastic spring 12 are only for illustration, and cannot be a limitation on the content and scope of the present invention.

Referring to FIGS. 4 to 7 and FIGS. 14 to 16, the elastic portion 1230 comprises at least one first elastic unit 1231 and at least one second elastic unit 1232, wherein the extending direction of the first elastic unit 1231 is different from the extending direction of the second elastic unit 1232, and the adjacent first elastic unit 1231 and second elastic unit 1232 are connected with each other end to end. If the number of the first elastic unit 1231 is the same as the number of the second elastic unit 1232, the elastic unit located at one end of the elastic portion 1230 is the first elastic unit 1231, and the elastic unit located at another end of the elastic portion 1230 is the second elastic unit 1232. At this time, the first elastic unit 1231 located at one end of the elastic portion 1230 is connected to the upper maintaining portion 1210, and the second elastic unit 1232 located at another end of the elastic portion 1230 is connected to the lower maintaining portion 1220. Accordingly, if the number of the first elastic unit 1231 is different from the number of the second elastic unit 1232, all of the elastic units located at opposite ends of the elastic portion 1230 are the first elastic unit 1231. At this time, the ends of the two first elastic units 1231 located at opposite ends of the elastic portion 1230 are connected to the upper maintaining portion 1210 and the lower maintaining portion 1220.

Figure 6A:
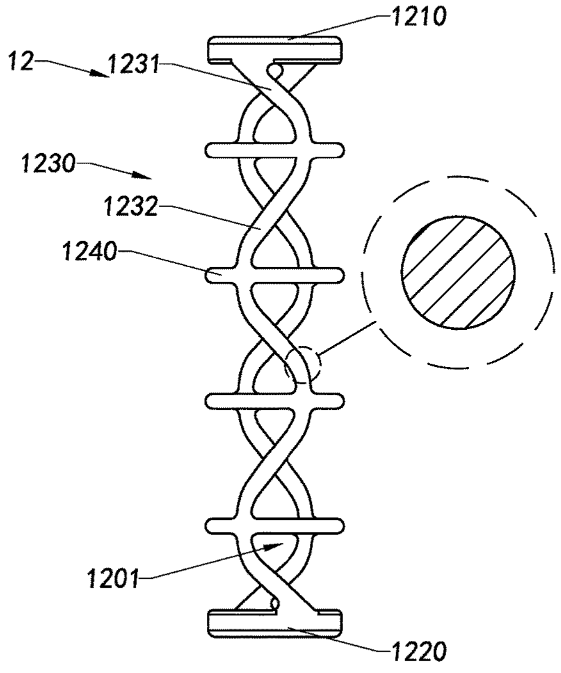
FIG. 6A is a schematic diagram of a modification embodiment of the plastic spring of the full-plastic liquid pump according to the above preferred embodiment of the present invention.
Figure 6B:
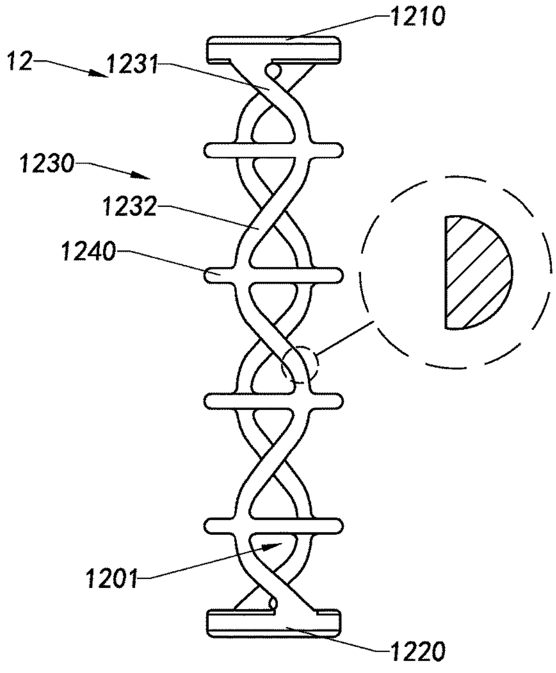
FIG. 6B is a schematic diagram of another modification embodiment of the plastic spring of the full-plastic liquid pump according to the above preferred embodiment of the present invention.
Figure 6C:
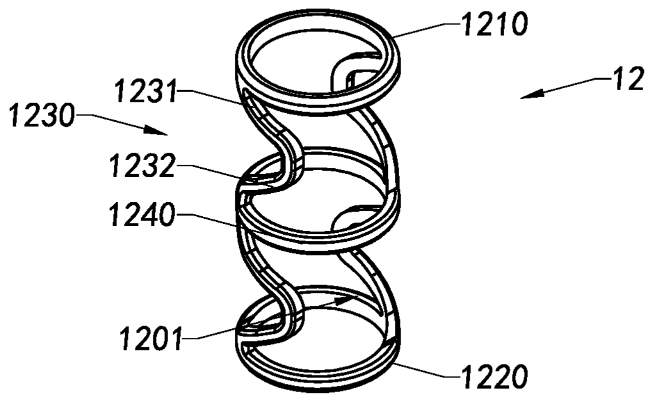
FIG. 6C is a schematic diagram of another modification embodiment of the plastic spring of the full-plastic liquid pump according to the above preferred embodiment of the present invention.
Figure 6D:
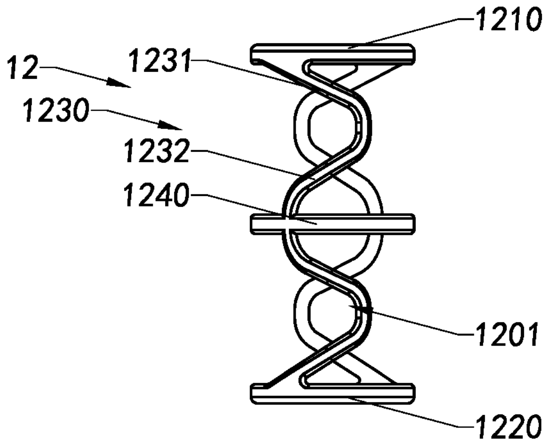
FIG. 6D is a schematic diagram of another modification embodiment of the plastic spring of the full-plastic liquid pump according to the above preferred embodiment of the present invention.

It is worth mentioning that the first elastic unit 1231 and the second elastic unit 1232 are not limited in the specific number and implementation manner. The first elastic unit 1231 and the second elastic unit 1232 may be implemented as one, two, three, or more than three quantities. The specific quantity of the first elastic unit 1231 and the second elastic unit 1232 may be the same or different. Referring to FIGS. 3 to 6B, the elastic portion 1230 is implemented as two, and the first elastic unit 1231 of each elastic portion 1230 is implemented as three, and the second elastic unit is implemented as two. Referring to FIGS. 6C to 6D, the first elastic unit 1231 and the second elastic unit 1232 of each elastic portion 1230 are implemented as two.

Further, referring to FIGS. 5 to 6B and FIG. 15A, the cross-sectional shape of the first elastic unit 1231 and the second elastic unit 1232 may be implemented as a triangle, square, rhombus, circle, semicircle, oval, or trapezoidal shape or other shapes. The cross-sectional shape of the first elastic unit 1231 and the second elastic unit 1232 may be the same or different. Those skilled in the art should understand that the plastic spring 12 may have different elasticities to suit different products by setting different numbers of the first elastic unit 1231 and the second elastic unit 1232. The specific embodiments of the first elastic unit 1231 and the second elastic unit 1232 disclosed in the description and the accompanying drawings are only examples and cannot be a limitation on the content and scope of the plastic spring of the present invention.

In a specific embodiment of the present invention, the connecting position of the elastic portion 1230 and the upper maintaining portion 1210 is located on the symmetrical axis of the upper maintaining portion 1210, which facilitates making the force received by the two elastic portions 1230 uniform during the upper maintaining portion 1210 moving downwardly due to a force, thereby synchronously and uniformly generating deformation. Preferably, the connecting positions of the two elastic portions 1230 and the lower maintaining portion 1220 are located on the symmetrical axis of the lower maintaining portion 1220, which facilitates uniform deformation of the two elastic portions 1230 during the process of the upper maintaining portion 1210 and the lower maintaining portion 1220 get close to each other. Alternatively, the connecting positions of the elastic portions 1230 and the upper maintaining portion 1210 may also be implemented as being arranged on both sides of the symmetrical axis of the upper maintaining portion 1210. Alternatively, the connecting positions of the elastic portions 1230 and the lower maintaining portion 1220 may also be implemented as being arranged on both sides of the symmetrical axis of the lower maintaining portion 1220. The specific connection positions of the elastic portion 1230 and the upper maintaining portion 1210 and the lower maintaining portion 1220 are only an example and cannot be a limitation on the content and scope of the full-plastic liquid pump 100 of the present invention.

Referring to FIGS. 4 to 7, in a specific embodiment of the present invention, the elastic portion 1230 is wavily extended from the upper maintaining portion 1210 to the lower maintaining portion 1220. Specifically, the first elastic unit 1231 is inclinedly and downwardly extended from left to right curvedly, and the second elastic unit 1232 is inclinedly and downwardly extended from right to left curvedly. A plurality of the first elastic units 1231 and a plurality of the second elastic units 1232 are connected with each other end to end to form an elastic portion 1230 having a wave shape. The first elastic unit 1231 of the elastic portion 1230 held between the upper maintaining portion 1210 and the lower maintaining portion 1220 corresponds to the second elastic unit 1232 of another elastic portion 1230. In the process that the upper maintaining portion 1210 and the lower maintaining portion 1220 are close to each other by an external force, the elastic portion 1230 is compressed and deformed in the manner that the first elastic unit 1231 and the second elastic unit 1232 get close to each other.

It is worth mentioning that the range of angle between the first elastic unit 1231 and the second elastic unit 1232 of the elastic portion 1230 is not limited. The specific ranges of the angle between the first elastic unit 1231 and the second elastic unit 1232, the angle between the first elastic unit 1231 and the horizontal plane, and the angle between the second elastic unit 1232 and the horizontal plane are only for illustration and cannot be a limitation on the content and scope of the full-plastic liquid pump 100 of the present invention.

Preferably, the two elastic portions 1230 are held parallel to each other between the upper maintaining portion 1210 and the lower maintaining portion 1220. Alternatively, the two elastic portions 1230 connect the upper maintaining portion 1210 and the lower maintaining portion 1220 in a non-parallel manner. Alternatively, the first elastic unit 1231 and the second elastic unit 1232 of the elastic portion 1230 may be implemented as extending in a straight line. As shown in FIGS. 13 to 16B, preferably, the plastic spring 12 comprises an upper maintaining portion 1210, a lower maintaining portion 1220 and two elastic portions 1230, wherein the elastic portions 1230 are spacedly extended between the upper maintaining portion 1210 and the lower maintaining portion 1220, each of the elastic portions 1230 comprises a plurality of first elastic units 1231 and comprises a plurality of second elastic units 1232, wherein the first elastic units 1231 and the second elastic units 1232 of each elastic portion 1230 are connected with each other end-to-end, wherein the first elastic units 1231 of each elastic portion 1230 are inclinedly and downwardly extended, the upper maintaining portion 1210, the lower maintaining portion 1220, and the second elastic units 1232 are extended horizontally. As shown in FIGS. 13 to 16B, more preferably, two ends of each second elastic unit 1232 of each elastic portion 1230 are respectively connected with two first elastic units 1231, and the two first elastic units 1231 connected with the each second elastic unit 1232 of the each elastic portion 1230 are extended along two different directions respectively such that when the plastic spring 12 is compressed, the lateral forces exerted on the two first elastic units 1231 connected with the two ends of the each second elastic unit 1232 are at least partially offset to prevent lateral movement of each first elastic unit 1231 of each elastic portion 1230. In this way, when the all-plastic liquid pump 1000 is used to pump liquid, the plastic spring 12 can avoid the elastic portions 1230 from being contacted with the inner wall of the pump housing 11, so that the liquid pressing cap 40 can be pressed smoothly. In other words, the two ends of each first elastic unit 1231 of the each elastic portion 1230 of the plastic spring 12 are provided with a restricting component extended horizontally to prevent the first elastic units 1231 from moving laterally when the plastic spring 12 is compressed. Preferably, the second elastic units 1232 of the two elastic portions 1230 are respectively located at different vertical positions to reduce the rigidity of the whole plastic spring 12 and make it easy be compressed.

Referring to FIGS. 14 to 16D, in a specific embodiment of the present invention, the two elastic portions 1230 are helically extended from the upper maintaining portion 1210 to the lower maintaining portion 1220. Specifically, the first elastic unit 1231 and the second elastic unit 1232 of one elastic portion 1230 of the two elastic portions 1230 held between the first maintaining portion 1210 and the second maintaining portion 1220 correspond respectively to the first elastic unit 1231 and the second elastic unit 1232 of another elastic portion 1230, and the two elastic portions 1230 are extended in manner of intersecting with each other to form a helical structure. In the process that the upper maintaining portion 1210 and the lower maintaining portion 1220 are close to each other by an external force, the two elastic portions 1230 are compressed and deformed in the manner that the second elastic units 1232 get close to each other.

Figure 14:
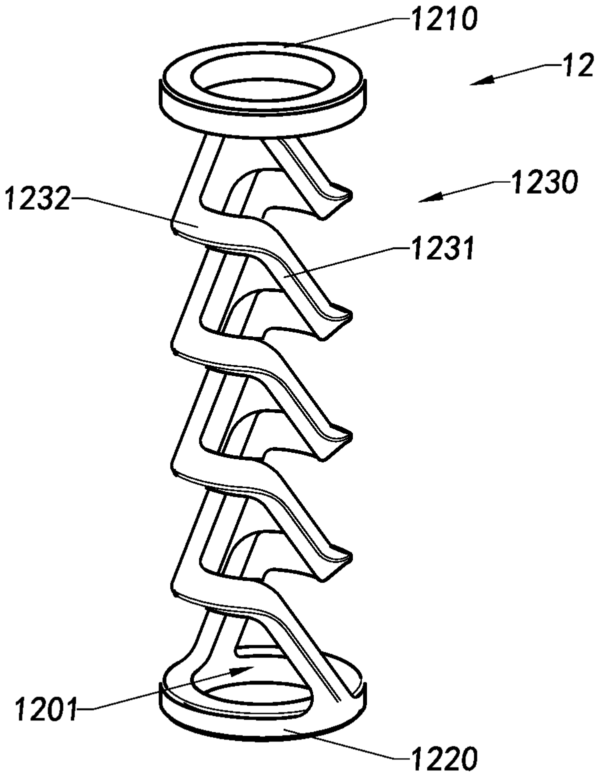
FIG. 14 is a structure diagram of the plastic spring of the full-plastic liquid pump of the containing container with a full-plastic liquid pump according to the above another preferred embodiment of the present invention.
Figure 15A:
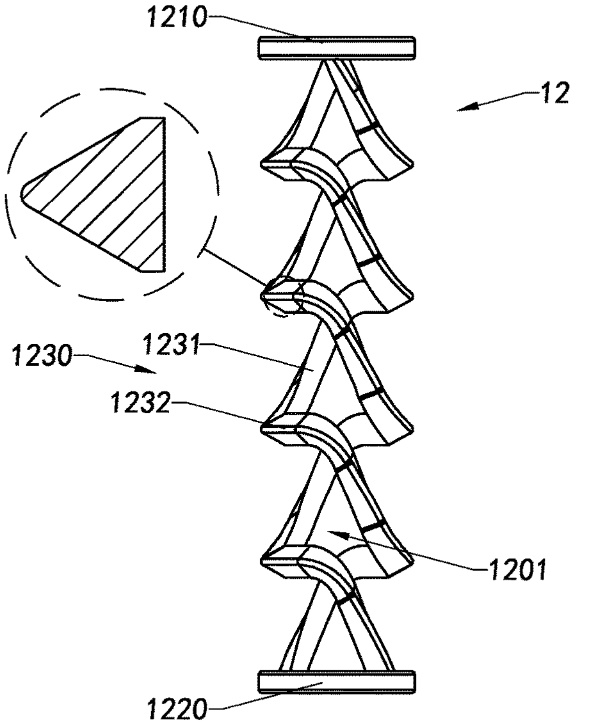
FIG. 15A is a structure diagram of the plastic spring of the full-plastic liquid pump of the containing container with a full-plastic liquid pump according to the above another preferred embodiment of the present invention.
Figure 15B:
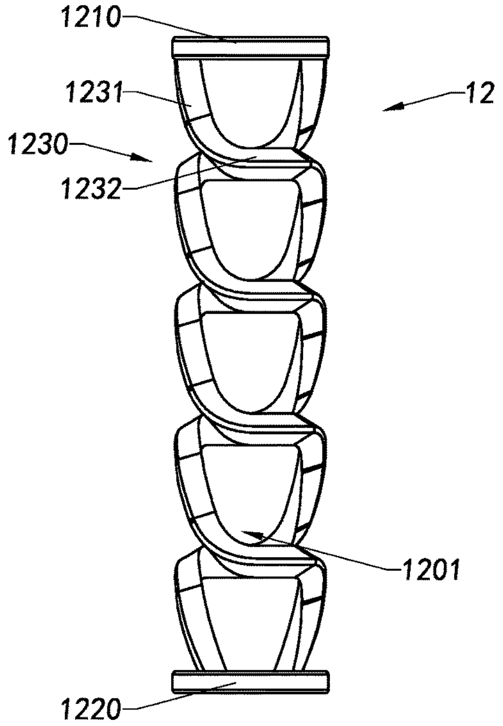
FIG. 15B is a structure diagram of the plastic spring of the full-plastic liquid pump of the containing container with a full-plastic liquid pump according to the above another preferred embodiment of the present invention.

Referring to FIGS. 14 to 15B, preferably, the first elastic unit 1231 of the elastic portion 1230 is inclinedly and downwardly extended, and the second elastic unit 1232 of the elastic portion 1230 is parallel to the horizontal plane. The second elastic unit 1232 is horizontally extended to limit the first elastic unit 1231 from generating deformation due to the excessive expansion after the first elastic unit 1231 being squeezed. Alternatively, Referring to FIGS. 16A to 16B, preferably, the first elastic unit 1231 of the elastic portion 1230 is inclinedly and downwardly extended, and the second elastic unit 1232 of the elastic portion 1230 is inclinedly and downwardly extended, i.e., there is an angle between the extension direction of the second elastic unit 1232 and the horizontal plane. Those skilled in the art should understand that the specific embodiment of the elastic portion 1230 extending in a helical shape is only an example and cannot be a limitation on the content and scope of the full-plastic liquid pump 100 of the present invention.

Referring to FIGS. 4 to 7, in the specific embodiment of the plastic spring 12 of the present invention, the plastic spring 12 further comprising at least one restricting portion 1240, wherein the restricting portion 1240 is connected with two elastic portions 1230 spaced from each other, and the extension direction of one elastic portion 1230 is different from the extension direction of another elastic portion 1230, thereby facilitating limiting the degree of deformation of the elastic portions 1230, avoiding excessive elastic deformation and fracture of the elastic portion 1230, and facilitating prolonging the service life of the plastic spring 12.

Preferably, the restricting portion 1240 is disposed at the connection position of the first elastic unit 1231 and the second elastic unit 1232 of the two elastic portions 1230. Alternatively, the restricting portion 1240 is disposed at the first elastic unit 1231 of the elastic portion 1230. Alternatively, the restricting portion 1240 is disposed at the second elastic unit 1232 of the elastic portion 1230.

Referring to FIGS. 4 to 6B, in a specific embodiment of the present invention, the restricting portion 1240 of the plastic spring 12 is shaped as a circular ring, and the restricting portion 1240 is disposed surrounding the two elastic portions 1230. The restricting portion 1240 is arranged at both sides of each elastic portion 1230. Referring to FIG. 7, alternatively, the restricting portion 1240 of the plastic spring 12 is shaped as a semicircular arc, and the openings of the adjacent two restricting portions 1240 face two opposite directions. The specific shape of the restricting portion 1240 is not limited, and the restricting portion 1240 may also be implemented as being folded-line shaped, square, rhombus, triangle, oval, etc.

Preferably, the restricting portion 1240 of the plastic spring 12 is disposed at the two elastic portions 1230 in the manner that the extension direction thereof is parallel to the horizontal plane. Alternatively, there is an angle between the extension direction of the restricting portion 1240 and the horizontal plane. As shown in FIGS. 3 to 6B, preferably, the plastic spring 12 comprises an upper maintaining portion 1210, a lower maintaining portion 1220, and two elastic portions 1230, wherein the elastic portions 1230 are spacedly extended between the upper maintaining portion 1210 and the lower maintaining portion 1220, wherein each of the elastic portions 1230 comprises a plurality of first elastic units 1231 and a plurality of second elastic units 1232, wherein the first elastic units 1231 and the second units 1232 of each elastic portion 1230 are connected with each other end-to-end, and the first elastic units 1231 and the second units 1232 of each elastic portion 1230 are inclinedly and downwardly extended along two different directions. As shown in FIGS. 3 to 6B, more preferably, the plastic spring 12 further comprises a plurality of restricting portions 1240, wherein at least one first elastic unit 1231 of one of the two elastic portions 1230 and at least one first elastic unit 1231 of another elastic portion 1230 of the two elastic portions 1230 are respectively arranged between two adjacent restricting portions 1240, and at least one second elastic unit 1232 of one of the two elastic portions 1230 and at least one second elastic unit 1232 of another elastic portion 1230 of the two elastic portions 1230 are respectively arranged between another two adjacent restricting portions 1240, wherein the restricting portions 1240 are annular and parallel to the horizontal plane, such that when the plastic spring 12 is compressed, the lateral forces exerted on the first elastic units 1231 of the two elastic portions 1230 arranged between two adjacent restricting portions 1240 and the lateral forces exerted on the second elastic units 1232 of the two elastic portions 1230 arranged between another two adjacent restricting portions 1240 are at least partially cancelled out by each other, preventing the lateral movement of the first elastic units 1231 and the second elastic units 1232 of each elastic portion 1230, wherein the upper maintaining portion 1210 and the lower maintaining portion 1220 are respectively formed by two of the restricting portions 1240. Additionally, the first elastic unit 1231 of one of the two elastic portions 1230 and the second elastic unit 1232 of another elastic portion 1230 of the two elastic portions 1230 are parallel to each other, which helps to prevent lateral movement of the first elastic units 1231 and the second elastic units 1232 of each elastic portion 1230. In this way, when the all-plastic liquid pump 1000 is used to extract liquid, the plastic spring 12 can avoid the elastic portion 1230 from coming into contact with the inner wall of the pump housing 11 and enable the liquid taking pressing cap 40 to be smoothly pressed. In other words, two ends of each first elastic unit 1231 and two ends of each second elastic unit 1232 of the elastic portion 1230 of the plastic spring 12 are respectively provided with the restricting portions 1240 extended horizontally, which prevent lateral movement of the first elastic unit 1231 when the plastic spring 12 is compressed. Further, the at least one first elastic unit 1231 of one of said two elastic portions 1230 and at least one first elastic unit 1231 of another of said two elastic portions 1230 arranged respectively between two adjacent restricting portions 1240 are extended along two different directions; the at least one second elastic unit 1232 of one of said two elastic portions 1230 and the at least one second elastic unit 1232 of another elastic portion of said two elastic portions 1230 arranged respectively between the two adjacent restricting portions 1240 are extended along two different directions.

It is worth mentioning that the specific implementation of the restricting portion 1240 of the plastic spring 12 is not limited, the number of the restricting portion 1240 of the plastic spring 12 may be implemented as one, two, three or more, and at least two restricting portions 1240 are disposed at the two elastic portions 1230 spacedly. Preferably, the distances between every two adjacent restricting portions 1240 are equal. Alternatively, the distances between every two adjacent restricting portions 1240 are not equal. The cross-sectional shape of the restricting portion 1240 of the plastic spring 12 may be implemented as being triangle, circle, square, rhombus, semicircle, etc. Those skilled in the art should understand that the specific embodiment of the restricting portion 1240 of the plastic spring 12 disclosed in the present description and accompanying drawings is only an example and cannot be a limitation on the content and scope of the full-plastic liquid pump 100 of the present invention.

Figure 8A:
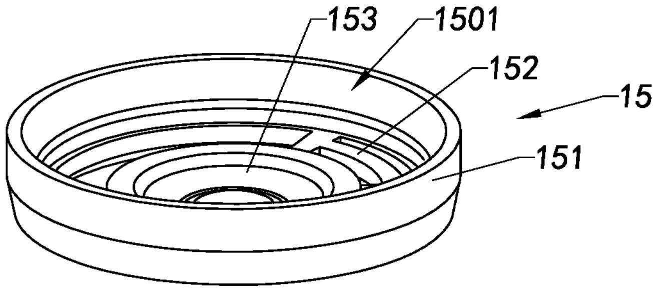
FIG. 8A is a structure diagram of a plastic one-way valve of the full-plastic liquid pump according to the above preferred embodiment of the present invention.
Figure 8B:
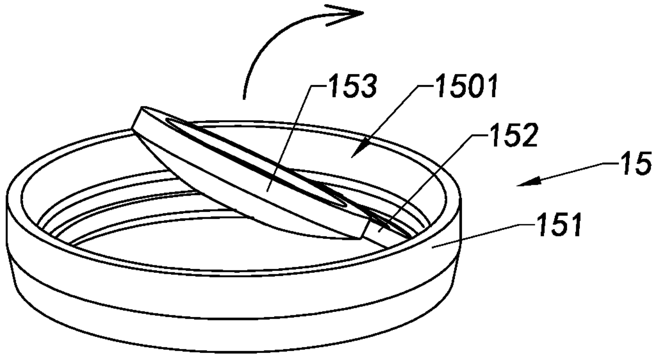
FIG. 8B is a structure diagram of the plastic one-way valve of the full-plastic liquid pump according to the above preferred embodiment of the present invention.

Referring to FIGS. 8A to 8B, in the specific embodiment of the full-plastic liquid pump 100 of the present invention, the plastic one-way valve 15 comprises a fixing portion 151, at least one connecting portion 152 and a shielding portion 153, wherein the fixing portion 151 has a flow communicating channel 1501, wherein the connecting portion 152 is deformably extended from the bottom portion of the fixing portion 151 to the shielding portion 153, wherein the connecting portion 152 and the shielding portion 153 are held in the flow communicating channel 1501 of the fixing portion 151. The fixing portion 151 is fixed to the pump housing 11 in the manner that the shielding portion 153 is capable of being attached at the inner wall of the pump housing 11, and the connecting portion 152 covers the upper end opening of the flow guiding pipe 30 completely, and the shielding portion 153 prevents the communication between the flow guiding channel 301 of the flow guiding pipe 30 and the liquid storage cavity 101 of the pump housing 11. The shielding portion 153 is capable of being driven up and down relative to the fixing portion 151 to allow liquid to flow, or block liquid flow.

Specifically, press the liquid taking pressing cap 40 of the liquid pump 1000, the piston 13 moves downwardly, the pressure in the liquid storage cavity 101 increases, the shielding portion 153 of the plastic one-way valve 15 is tightly attached on the inner wall of the pump housing 11 under the action of the pressure difference, and the upper end opening of the flow guiding pipe 30 is closed. When the external force received by the liquid taking pressing cap 40 is removed, the spring 12 drives the piston 12 to move upwardly, the pressure in the liquid storage cavity 101 decreases, under the action of the pressure difference, the shielding portion 153 of the plastic one-way valve 15 is arched up, the shielding portion 153 upwardly moves relative to the fixing portion 151, the upper end opening of the flow guiding pipe 30 is opened, the flow communicating channel 1501 of the plastic one-way valve 15 communicates the flow guiding channel 301 of the flow guiding pipe 30 and the liquid storage cavity 101 of the pump housing 11, and the liquid in the liquid receiving space 200A of the containing container 200 is capable of entering into the liquid storage cavity 101 of the pump housing 11 from the flow guiding channel 301 of the flow guiding pipe 30.

In a specific embodiment of the present invention, the fixing portion 151 of the plastic one-way valve 15 is installed in the pump housing 11 in manner of clearance fit, and the pressure difference formed in the process that the piston 13 is driven to move up and down cannot push the fixing portion 151 of the plastic one-way valve 15 to move relative to the pump housing 11. Preferably, the fixing portion 151 of the plastic one-way valve 15 is fixed at the pump housing 11 in manner of gluing. Alternatively, the fixing portion 151 of the plastic one-way valve 15 is fixed at the pump housing 11 in manner of threaded connection. Those skilled in the art should understand that the specific embodiment of the plastic one-way valve 15 is only an example and cannot be a limitation on the content and scope of the full-plastic liquid pump 100 of the present invention.

In the specific embodiment of the full-plastic liquid pump 100 of the present invention, in the process that the shielding portion 153 of the plastic one-way valve 15 is driven to move upwardly, the connecting portion 152 of the plastic one-way valve 15 generates deformation, and when the shielding portion 153 is attached on the inner wall of the pump housing 11, the connection portion 152 recovers.

Preferably, referring to FIGS. 8A and 8B, the number of the connecting portion 152 of the plastic one-way valve 15 is implemented as being one, i.e., only one side of the shielding portion 153 is connected to the fixing portion 151. On the one hand, under the action of the pressure difference, the shielding portion 153 is capable of being rapidly flipped up or down relative to the fixing portion 151; On another hand, when the shielding portion 153 upwardly moves relative to the fixing portion 151, the flow of liquid being allowed to flow through the flow communicating channel 1501 is maximum.

Figure 8C:
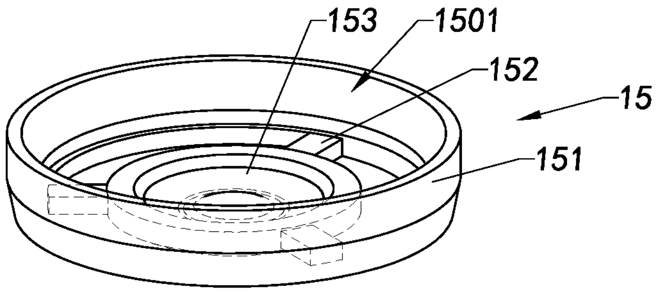
FIG. 8C is a structure diagram of a modification embodiment of the plastic one-way valve of the full-plastic liquid pump according to the above preferred embodiment of the present invention.
Figure 8D:
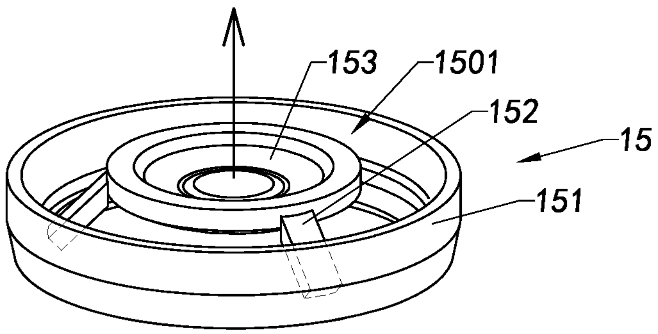
FIG. 8D is a structure diagram of the above modification embodiment of the plastic one-way valve of the full-plastic liquid pump according to the above preferred embodiment of the present invention.

Alternatively, the number of the connecting portion 152 of the plastic one-way valve 15 may be implemented as being two, three, or more, and at least two connecting portions 152 are arranged around the shielding portion 153 spacedly. Referring to FIGS. 8C and 8D, the number of the connecting portion 152 is implemented as being three, and the both ends of the three connecting portions 152 disposed spacedly from each other are connected respectively to the shielding portion 153 and the fixing portion 151, when the shielding portion 153 is driven to move upwardly, the connecting portion 152 generates deformation, and the liquid flows through the channel between the shielding portion 153, the connecting portion 152, and the fixing portion 151. Those skilled in the art should understand that the specific embodiment of the connecting portion 152 of the plastic one-way valve 15 is only an example and cannot be a limitation on the content and scope of the full-plastic liquid pump 100 of the present invention.

In the specific embodiment of the present invention, the lower surface of the shielding portion 153 of the plastic one-way valve 15 is an arc-shaped curved surface, which is conducive to the shielding portion 153 to better seal the pump housing 11 and the communicating opening of the flow guiding pipe 30. For example, but not limited to, the shielding portion 153 is implemented as a hemispherical shape, or having a crescent-like cross-section, etc. Those skilled in the art should understand that the lower surface of the shielding portion 153 may also be implemented as a plane, and the shielding portion 153 may also be implemented as a piece, spherical and other structure. The specific embodiment of the shielding portion 153 is only an example and cannot be a limitation on the content and scope of the full-plastic liquid pump 100 of the present invention.

It is worth mentioning that the plastic spring 12 and the plastic one-way valve 15 of the full-plastic liquid pump 100 of the present invention replace the metal spring and the glass ball valve of the existing emulsion pump, so that the full-plastic liquid pump 100 is made of plastic material as a whole, and the discarded full-plastic liquid pump 100 can be recycled and reused as a whole without splitting, thereby reducing the cost of recycling and reusing the full-plastic liquid pump 100.

Those skilled in the art will appreciate that the above embodiments are only exemplary examples, wherein the features of different embodiments may be combined with each other to obtain an embodiment that is easily thought of according to the disclosure of the present invention but not expressly indicated in the drawings. Those skilled in the art should understand that the above description and embodiments of the present invention shown in the drawings are only for example and do not limit the present invention. The objects of the present invention have been fully and effectively accomplished. The functional and structural principles of the present invention have been demonstrated and illustrated in embodiments, and in the absence of deviating from the stated principle, embodiments of the present invention may be subject to any deformation or modification.

What is claimed is:

1. A liquid pump, comprising:

a movable flow guiding member having a flow guiding passage;

a liquid taking pressing cap having a liquid outlet channel, wherein said liquid taking pressing cap is disposed at said movable flow guiding member, wherein said liquid outlet channel is communicated with said flow guiding passage of said movable flow guiding member; and a pump main body comprising a pump housing, a plastic spring, a piston, a piston base, a plastic one-way valve, an assembling housing and a spring holding base, wherein said plastic one-way valve is disposed at said pump housing, wherein said plastic one-way valve comprises a fixing portion, at least one connecting portion and a shielding portion, wherein said fixing portion has a flow communicating channel, wherein said connecting portion is deformably extended between said fixing portion and said shielding portion, wherein said connecting portion and said shielding portion are held in said flow communicating channel of said fixing portion, said fixing portion is fixed to said pump housing, wherein a lower surface of said shielding portion is an arc-shaped curved surface, said pump housing is disposed at said assembling housing, wherein said movable flow guiding member comprises a flow guiding portion, an abutting portion and a holding portion, said spring holding base comprises a carrying portion and a holding arm extended outwardly from said carrying portion, wherein said abutting portion is extended from said flow guiding portion to said holding portion, said holding portion is located outside said flow guiding portion, wherein said plastic spring is sleeved on said flow guiding portion of said movable flow guiding member, wherein said pump housing has a liquid storage cavity, said piston base has a communicating channel and a flow communicating hole communicated with said communicating channel, wherein said communicating channel of said piston base is communicated with said flow guiding passage of said movable flow guiding member, wherein said carrying portion of said spring holding base is held in said liquid storage cavity of said pump housing, and two ends of said plastic spring are respectively connected with said abutting portion of said movable flow guiding member and said carrying portion of said spring holding base, wherein said plastic spring comprises an upper maintaining portion, a lower maintaining portion and two independent elastic portions which are spaced from each other between said upper maintaining portion and said lower maintaining portion, wherein said elastic portion is curvedly extended from said upper maintaining portion to said lower maintaining portion, wherein said upper maintaining portion, said lower maintaining portion and said elastic portion are integrally molded, wherein said piston is installed at said piston base, said piston base is installed at said movable flow guiding member such that said movable flow guiding member is capable of driving said piston and said piston base to move, wherein said piston has an outer wall attached on an inner wall of said pump housing, and said piston is capable of moving with respect to said piston base such that when said piston is in an original position, said piston is capable of blocking said communicating hole of said piston base; when said piston is driven to move downwardly an appropriate distance, said piston is capable of exposing said communicating hole of said piston base to enable said communicating hole of said piston base to be communicated with said communicating channel of said piston base and said fluid storage chamber of said pump housing, respectively, wherein each of said two elastic portions comprises a plurality of first elastic units and a plurality of second elastic units, wherein said first elastic units and said second elastic units are connected with each other end-to-end, wherein said first elastic units are inclinedly extended downwardly, said second elastic units of each elastic portion are parallel with each other and extended horizontally, a cross-sectional shape of each of said first elastic units and said second elastic units is a triangle, said upper maintaining portion and said lower maintaining portion are extended horizontally, wherein said plastic spring is completely made of deformable plastic material, wherein the entire liquid pump is made of plastic material, wherein said assembling housing comprises a housing main body and a contaminant scraping arm extending inclinedly upward from said housing main body and having an inner surface configured to scrape contaminants from a container opening while providing a radial sealing surface for said holding portion, wherein said holding portion has an outer surface attached on said inner surface of said contaminant scraping arm, wherein said movable flow guiding member defines an installation space for receiving said plastic spring therein, wherein said installation space is downwardly extended from said abutting portion and at least partially defined between said flow guiding portion and said holding portion, such that said plastic spring and said contaminant scraping arm abut against two opposite sides of said holding portion, respectively, wherein when said plastic spring is compressed, said elastic portions expand laterally outward to press said holding portion against said inner surface of said contaminant scraping arm, thereby scraping contaminants from said container opening and forming a radial seal preventing external fluid ingress.

2. The liquid pump, as recited in claim 1, wherein said carrying portion has an accommodating cavity and said holding portion is movably held inside said accommodating cavity of said carrying portion, wherein said holding portion has an external thread and said carrying portion has an internal thread matched with said external thread of said holding portion such that said liquid pump is capable of being locked in a locked state.

3. The liquid pump, as recited in claim 1, wherein said carrying portion has an accommodating cavity and an assembling opening communicated with said accommodating cavity, wherein said movable flow guiding member is held in said accommodating cavity of said carrying portion, wherein said flow guiding portion of said movable flow guiding member movably and at least partially protruded out of said assembling opening of said carrying portion.

4. The liquid pump, as recited in claim 1, wherein said assembling housing further comprises a connecting member, wherein said contaminant scraping arm is inclinedly extended upwardly from said connecting member such that said contaminant scraping arm and said connecting member form a contaminant protecting covering.

5. The liquid pump, as recited in claim 1, wherein each of said movable flow guiding member, said liquid taking pressing cap and said pump main body is completely made of plastic material.

* * * * *